(12) United States Patent
Takahashi et al.

(10) Patent No.: US 8,406,346 B2
(45) Date of Patent: Mar. 26, 2013

(54) CODE ERROR DETECTING DEVICE, WIRELESS SYSTEM AND CODE ERROR DETECTING METHOD

(75) Inventors: Kazuaki Takahashi, Tokyo (JP); Suguru Fujita, Tokyo (JP); Michiaki Matsuo, San Jose, CA (US); Yutaka Murakami, Osaka (JP); Satoshi Hasako, Tokyo (JP)

(73) Assignee: Panasonic Corporation, Osaka (JP)

( * ) Notice: Subject to any disclaimer, the term of this patent is extended or adjusted under 35 U.S.C. 154(b) by 1132 days.

(21) Appl. No.: 12/305,570

(22) PCT Filed: Jun. 20, 2007

(86) PCT No.: PCT/JP2007/062447
§ 371 (c)(1),
(2), (4) Date: Dec. 18, 2008

(87) PCT Pub. No.: WO2007/148732
PCT Pub. Date: Dec. 27, 2007

(65) Prior Publication Data
US 2009/0177954 A1    Jul. 9, 2009

(30) Foreign Application Priority Data

Jun. 20, 2006  (JP) .................................. 2006-170451
Jun. 19, 2007  (JP) .................................. 2007-161850

(51) Int. Cl.
*H03D 3/22*  (2006.01)
*H04L 7/00*  (2006.01)
*H04B 7/208*  (2006.01)

(52) U.S. Cl. .......................... 375/329; 375/354; 370/344

(58) Field of Classification Search .................. 375/329, 375/354; 370/344
See application file for complete search history.

(56) References Cited

U.S. PATENT DOCUMENTS

| | | | | |
|---|---|---|---|---|
| 6,493,335 | B1 * | 12/2002 | Darcie et al. | 370/344 |
| 6,501,807 | B1 * | 12/2002 | Chieu et al. | 375/329 |
| 6,834,179 | B2 * | 12/2004 | Bergerhoff | 455/59 |
| 6,908,037 | B2 * | 6/2005 | Kim | 235/492 |

(Continued)

FOREIGN PATENT DOCUMENTS

| JP | 2004-229288 | 8/2004 |
|---|---|---|
| JP | 2006-94456 | 4/2006 |

(Continued)

OTHER PUBLICATIONS

International Search Report dated Jul. 17, 2007.

(Continued)

*Primary Examiner* — David C. Payne
*Assistant Examiner* — Sarah Hassan
(74) *Attorney, Agent, or Firm* — Dickinson Wright PLLC

(57) ABSTRACT

A code error detecting device that can more precisely detect a code error due to a delayed wave is disclosed. The code error detecting device includes a receiving antenna (121) for receiving a on-off keying modulated pulse and its code-reversed pulse, a pulse detector (124) for outputting detected data in accordance with the pulses, a code comparing unit (128) for comparing each code of first received data (R1) with one of second received data (R2), wherein the first and second received data are derived from the output detected data, and an error detecting unit (129) for detecting an error of each code from a comparison result (D2) indicative of a result compared in the code comparing unit (128).

9 Claims, 29 Drawing Sheets

U.S. PATENT DOCUMENTS

| | | | | |
|---|---|---|---|---|
| 2002/0101330 A1* | 8/2002 | Bergerhoff | ............... | 340/5.63 |
| 2004/0057500 A1* | 3/2004 | Balachandran et al. | ...... | 375/138 |
| 2004/0076251 A1* | 4/2004 | Kim | ............... | 375/354 |
| 2004/0141568 A1* | 7/2004 | Huat | ............... | 375/295 |
| 2004/0255220 A1 | 12/2004 | Sudo | | |
| 2006/0045177 A1 | 3/2006 | Kurashima | | |
| 2006/0229053 A1* | 10/2006 | Sivard | ............... | 455/343.2 |
| 2007/0046480 A1* | 3/2007 | Stein | ............... | 340/601 |
| 2008/0185441 A1* | 8/2008 | Henry et al. | ............... | 235/473 |
| 2009/0040022 A1* | 2/2009 | Finkenzeller | ............... | 340/10.1 |

FOREIGN PATENT DOCUMENTS

WO    03/084108    10/2003

OTHER PUBLICATIONS

Motohiko Isaka, et al., "A tutorial on "parallel concatenated (Turbo) coding," "Turbo (iterative) decoding" and related topics," Institute of Electronics, Information and Communication Engineers, IEICE technical report, IT98-51. Dec. 1998, pp. 1 and 2, p. 4, line 11.

"Low density parity check code and decoding method" TRICEPS, Jun. 5, 2002, pp. 1-7, p. 4, line 17.

"Impress standard textbook series, improved edition, 802.11 high-speed wireless LAN textbook," Impress Corporation, Jan. 1, 2005, pp. 1-7, p. 4, line 19.

"Digital wireless transmission technique," Pearson Education, Sep. 1, 2002, pp. 1-8, p. 4, line 22.

Yutaka Yasuda, et al. "Maximum Likelihood Decoding of Convolutional Codes and Its Performance Characteristics," Institute of Electronics, Information and Communication Engineers A, vol. J73-A, No. 2 , Feb. 1990, 1 page total, p. 4, line 24.

* cited by examiner

| COMPARISON OF CORRELATION VALUES | C1 |
|---|---|
| FIRST CORRELATOR OUTPUT VALUE<SECOND CORRELATOR | 0 |
| FIRST CORRELATOR OUTPUT VALUE≥SECOND CORRELATOR | 1 |

FIG.15

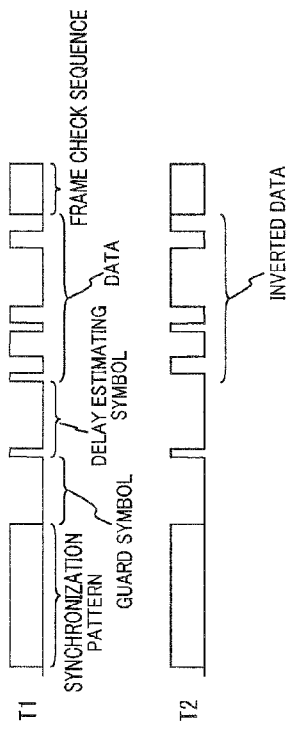
FIG.17
FIG.18
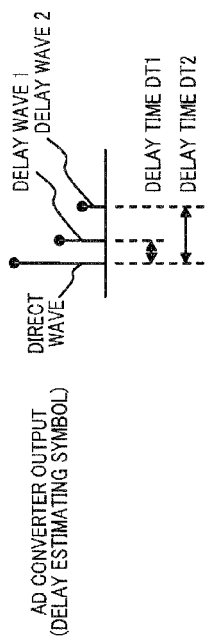
FIG.19

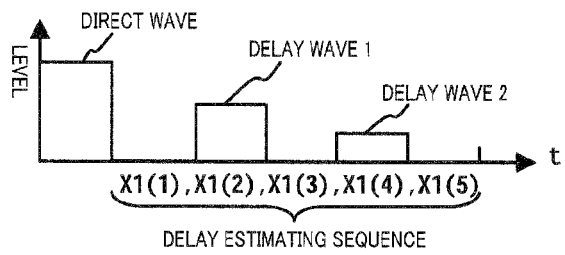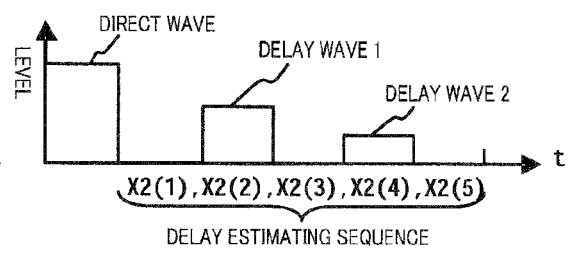
FIG.20A                    FIG.20B

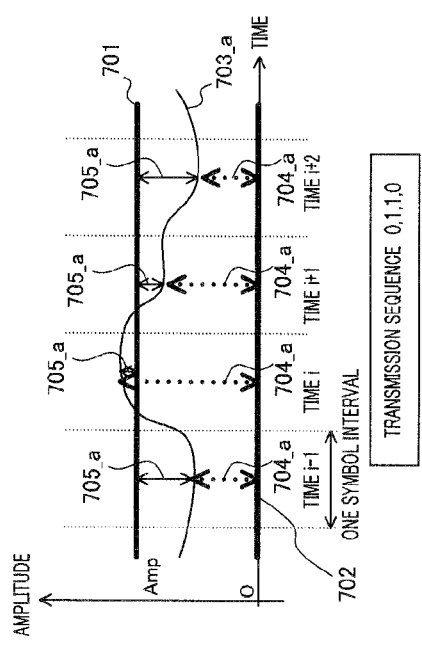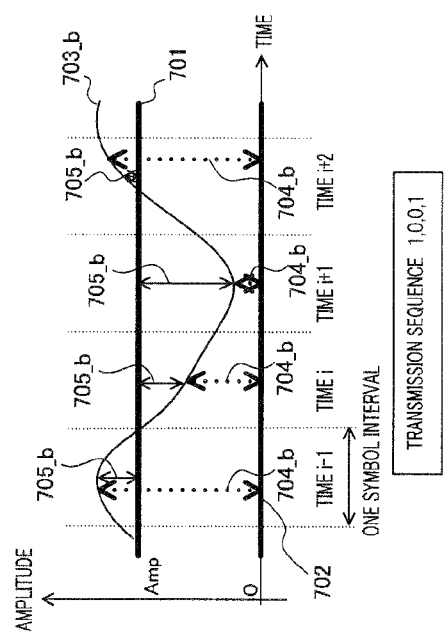
FIG.29A
FIG.29B

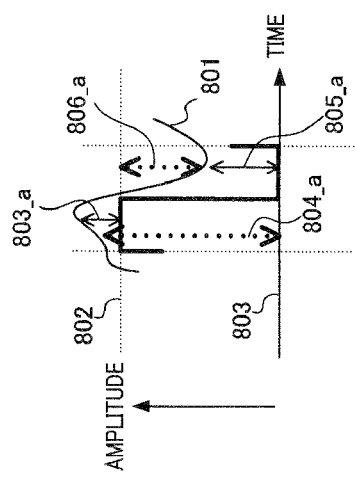
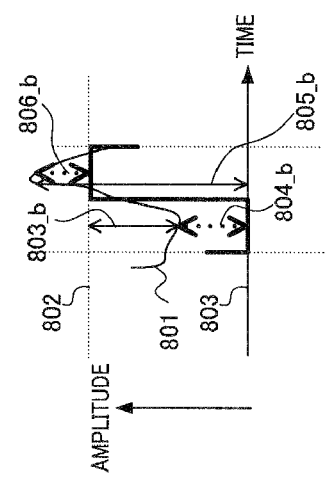
FIG.31A
FIG.31B

CODE ERROR DETECTING DEVICE, WIRELESS SYSTEM AND CODE ERROR DETECTING METHOD

TECHNICAL FIELD

The present invention relates to a code error detecting apparatus, radio system and error detecting method for detecting a code error of a received signal modulated using on-off keying ("OOK").

BACKGROUND ART

Recently, multimedia data such as music data and image data is desired to be exchanged between the devices by mutually connecting devices such as a mobile telephone, audio visual device and personal computer. To be more specific, it is anticipated to manage music data recorded by an audio device in a personal computer or transfer image data recorded by a visual device to a mobile telephone and view the image data outside.

UWB (Ultra Wide Band) for transmitting pulse signals in a wide frequency band is focused upon as such a data communication scheme between devices. Taking into account the characteristic of UWB of transmitting pulse signals, the OOK modulation scheme is optimal for transmitting data depending on whether or nor there is a pulse.

However, even if signals are modulated and transmitted according to the OOK scheme, multipath propagation due to reflection, scattering and diffraction occurs depending on the surrounding environment and delay waves arrive causing deterioration of signals. Such a situation will be described with reference to FIG. 1.

Transmission signal D100 shown in FIG. 1 is subjected to OOK modulation at the transmitting end and is encoded into symbols of "1" or "0" depending on whether or not there is a pulse.

On the other hand, although transmission signal D100 is received at the receiving end as received signal D101, delay waves arrive and interference occurs due to the main waves and delay waves. For example, in FIG. 1, although the two "1" symbol intervals (encircled portions) in received signal D101 are fundamentally "0" symbol intervals, these symbol intervals are encoded to "1" by error because two delay waves TF 3 and TF 4 have arrived.

The above conventional method for avoiding a code error due to the delay waves is disclosed (for example, Patent Document 1).

FIG. 2 shows a conventional example of transmission signal (PPM (Pulse Position Modulation) signal) D111 and received signals D112, D113 and D114. A case of a four-pulse position modulation is illustrated here. In this case, each code is divided into four different time slots S1 to S4 and each time slot shows digits of each code. Further, only one of the four different time slots has a voltage level representing binary 1.

Three received signals D112 to D114 shown in FIG. 2 are the direct wave and delay waves of transmission signal D111 received at the receiving end, and received data signal D115 is data multiplexed by superimposing these received signals D112 to D114. Consequently, received data signal D115 has a wider pulse width than transmission signal D111, thereby producing a bit error upon a demodulation.

However, by carrying out the processing shown in FIG. 3, for example, the above bit error is avoided. To be more specific, as shown in FIG. 3A, transmission signal D111 is re-encoded according to the relationship between codes and pulse positions. For example, in FIG. 3A, a combination of codes is shown in which "11" is followed by "00" (see the upper part), and this combination of codes is re-encoded to "0100" (see the lower part), so that the pulse width is reduced to half.

Further, as shown in FIG. 3B, a recovered signal obtained by recovering the received signal is re-encoded based on the combination of codes in the recovered signal. Furthermore, the received signal here refers to the code delay (i.e. extended portion) of received data signal D115 of FIG. 2 of transmission signal D111. For example, in FIG. 3B, if there is a combination of codes in which "0001" is followed by "0000" in the recovered signal, the recovered signal is re-encoded to "00011000."

By carrying out such re-encoding processing, even if a pulse width becomes wider due to the influence of delay waves, it is possible to avoid a code error due to delay waves.
Patent Document 1: Japanese Patent Application Laid-Open No. 2004-229288 (paragraph [0033] to [0037], FIG. 4, FIG. 5 and FIG. 8)
Non-Patent Document 1: "Signpost to Shannon limit: A tutorial on "parallel concatenated (Turbo) coding," "Turbo (iterative) decoding" and related topics," Motohiko Isaka and Hideki Imai, Institute of Electronics, Information and Communication Engineers, IEICE technical report, IT98-51, December 1998.
Non-Patent Document 2: "Low density parity check code and decoding method" TRICEPS
Non-Patent Document 3: "Impress standard textbook series, improved edition, 802.11 high-speed wireless LAN textbook," Impress Corporation
Non-Patent Document 4: "Digital wireless transmission technique," Pearson Education
Non-Patent Document 5: "Maximum Likelihood Decoding of Convolutional Codes and Its Performance Characteristics," Yutaka Yasuda and Yasuo Hirata, Institute of Electronics, Information and Communication Engineers A, Vol. J73-A, No. 2, pp. 218 to 224

DISCLOSURE OF INVENTION

Problems to be Solved by the Invention

However, with the method disclosed in Patent Document 1, if a delay wave becomes wider than the width of a time slot, it is difficult to carry out re-encoding processing.

The present invention is made to solve such a disadvantage and is therefore directed to an object of providing a code error detecting apparatus that enables more accurate detection of code errors due to delay waves.

Means for Solving the Problem

To achieve the above object, the code error detecting apparatus according to the present invention includes: a receiving terminal that receives a first pulse signal sequence subjected to on-off keying modulation and a second pulse signal sequence inverting a code of the first pulse signal sequence; a pulse detecting section that outputs first and second detected data based on the first pulse signal sequence and the second pulse signal sequence received at the receiving terminal; a code comparing section that compares codes of the first and second detected data output from the pulse detecting section; and an error detecting section that detects errors of the codes based on comparison results in the code comparing section.

With such a configuration, it is possible to predict in advance the comparison result when there are errors in codes, from the first pulse signal sequence and the second pulse signal sequence that inverts the code of the first pulse signal sequence.

Advantageous Effect of the Invention

The present invention enables more accurate detection of code errors due to delay waves.

BRIEF DESCRIPTION OF DRAWINGS

FIG. 15 shows a comparison result C1 of a quantity comparing section according to Embodiment 4;

FIG. 17 shows a logic table of a data value determining section according to Embodiment 4;

FIG. 18 shows configuration examples of transmission data T1 upon the first transmission and transmission data T2 upon a retransmission;

FIG. 19 shows a condition of an output waveform of an AD converter;

FIG. 20 shows arrival timings of delay waves when the delay estimating symbol length is six symbols;

FIG. 29 shows received signal waveforms;

FIG. 31 shows received signal waveforms according to Embodiment 7.

BEST MODE FOR CARRYING OUT THE INVENTION

Embodiments of the present invention will be described in detail below with reference to the drawings.

Embodiment 1

Figure 1:
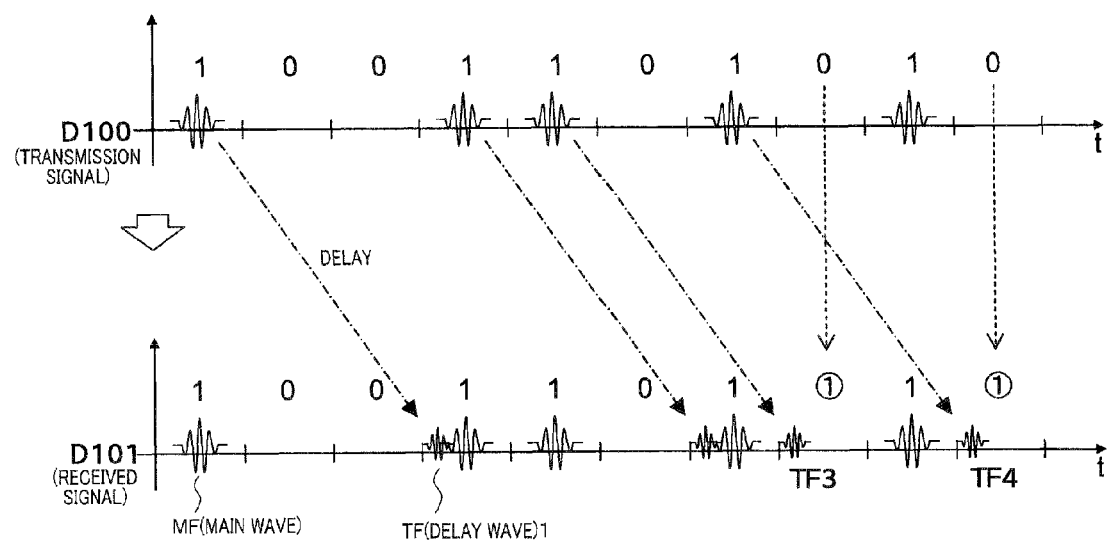
FIG. 1 illustrates the influence of multipath in the OOK modulation scheme.
Figure 2:
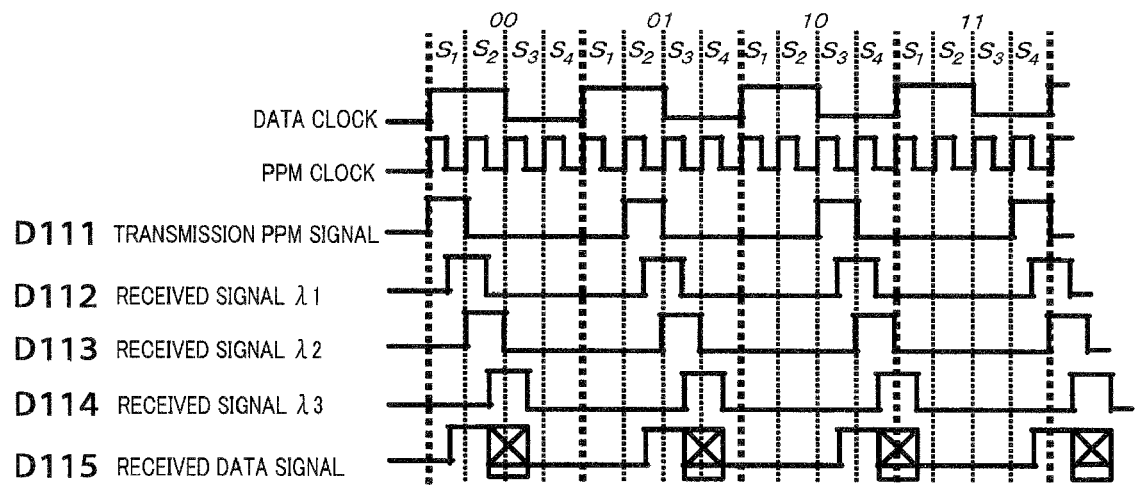
FIG. 2 shows a conventional example of a transmission signal and received signals.
Figure 3A:
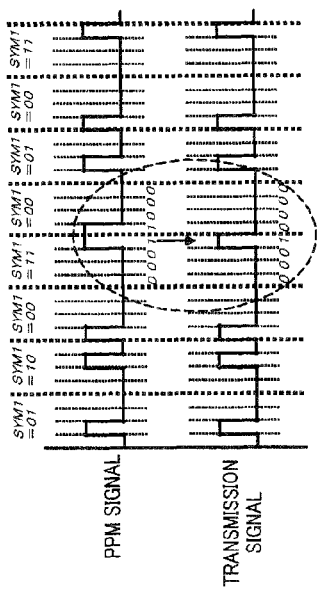
FIG. 3 illustrates a conventional example of re-encoding processing.
Figure 3B:
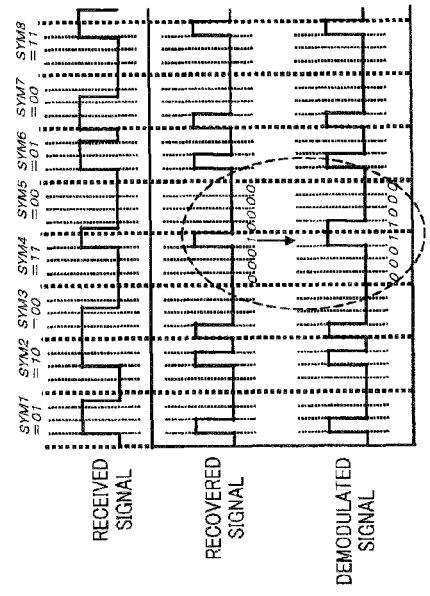
Figure 4:
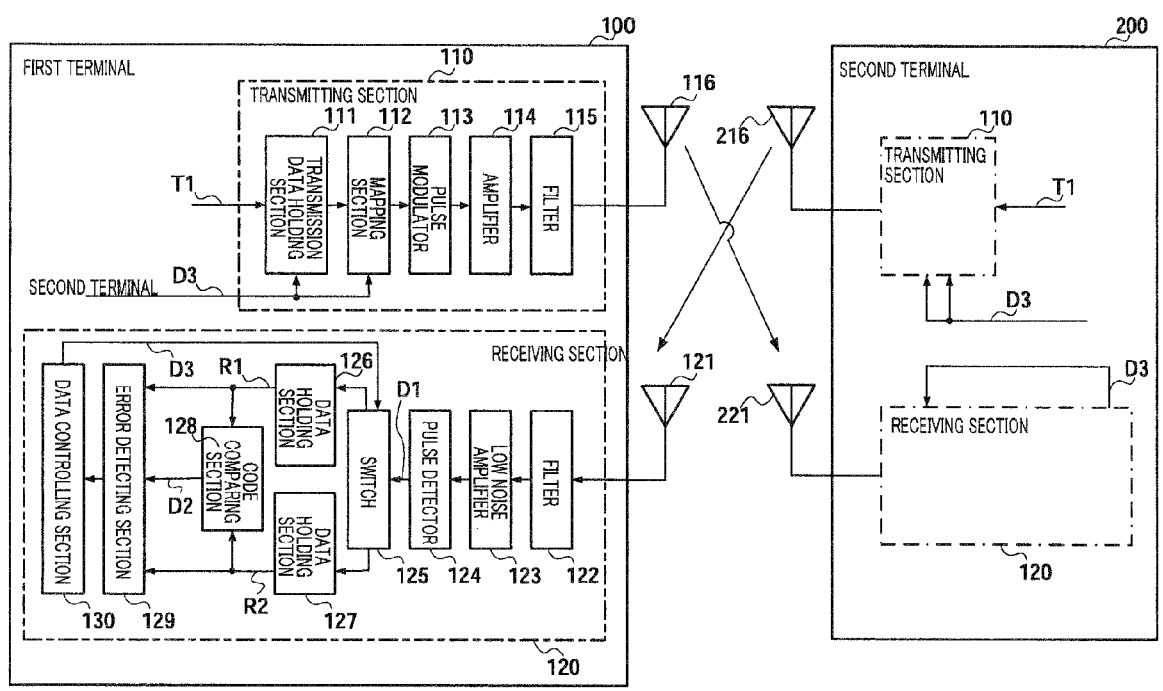
FIG. 4 is a block diagram showing a configuration example of a wireless communication system according to Embodiment 1 of the present invention.

FIG. 4 is a block diagram showing a configuration example of a wireless communication system according to Embodiment 1 of the present invention.

In FIG. 4, a wireless communication system is configured including first terminal 100 and second terminal 200. These terminals 100 and 200 are, for example, mobile telephones, audio visual devices and personal computers.

First terminal 100 is configured including transmitting section (transmitting apparatus) 110 and receiving section (receiving apparatus: error code detecting apparatus) 120. Meanwhile, transmitting section 110 and receiving section 120 may be implemented as, for example, LSI or may be contained on a single chip.

Transmitting section 110 has transmission data holding section 111 that stores transmission data T1 on a temporary basis and mapping section 112 that extracts transmission data T1 from transmission data holding section 111 at a predetermined timing and allocates codes to transmission data T1. The predetermined timing refers to the timing the retransmission control signal D3 (described later) is input to mapping section 112. When receiving as input the retransmission control signal D3, mapping section 112 inverts codes for transmission data T1 and allocates the codes again to transmission data T1.

Further, transmitting section 110 has: pulse modulator 113 that outputs pulses matching codes allocated by mapping section 112; amplifier 114 that amplifies the pulses output from pulse modulator 113; and filter 115 that extracts a desired wave from the amplified pulses and outputs the result to transmitting antenna 116. With the present embodiment, pulse modulator 113 carries out pulse modulation according to the OOK scheme. Further, transmitting antenna 116 outputs in the air pulses (i.e. the second pulse signal sequence) based on inverted codes allocated again in mapping section 112 and pulses (i.e. the first pulse signal sequence) based on codes allocated upon the first time.

Receiving section 120 has: filter 122 that extracts a desired wave from a radio wave input to receiving antenna (receiving terminal) 121; low noise amplifier 123 that carries out low noise amplification of a weak radio wave and improves the sensitivity; pulse detector (pulse detecting section) 124 that acquires detected data D1 from the pulses acquired in low noise amplifier 123; and switch 125 that changes the destination at which detected data D1 (i.e. received data) is held, to first data holding section 126 or second data holding section 127. With the present embodiment, first data holding section 126 holds first received data (i.e. detected data) R1 extracted from detected data which is based on the code allocated upon the first time, and second data holding section 127 holds second received data R2 acquired from detected data which is based on the inverted code.

Further, receiving section 120 has: first data holding section 126; second data holding section 127; code comparing section 128 that compares (for example, XOR) the codes of both received data R1 and R2 held in first data holding section 126 and second data holding section 127; error detecting section 129 that detects code (i.e. bit) errors from comparison result information D2 in code comparing section 128; and data controlling section 130 that outputs a retransmission control signal D3 for retransmitting transmission data T1 according to the detection result in error detecting section 129. The output destination of the retransmission control signal D3 is transmitting section 110 (transmission data holding section 111 and mapping section 112) of second terminal 200 and switch 125 of first terminal 100.

Figure 5:
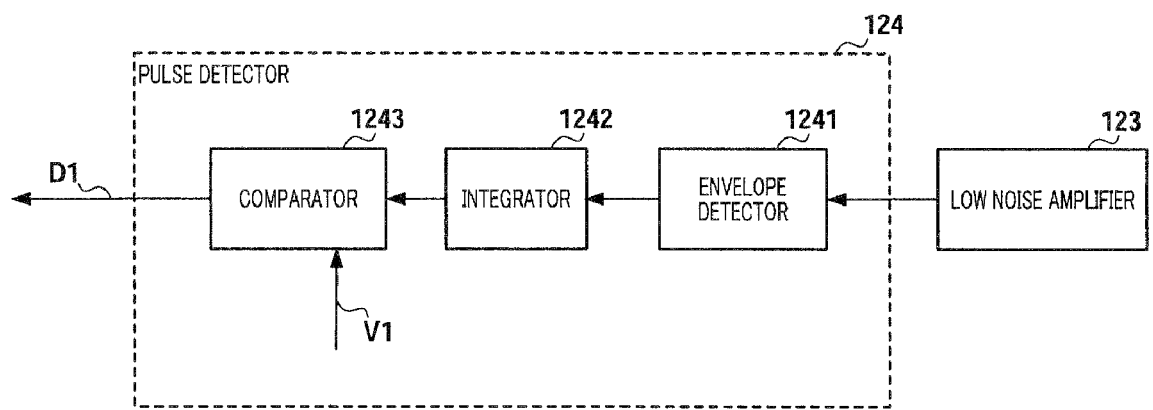
FIG. 5 is a block diagram showing a configuration example of a pulse detector according to Embodiment 1.

FIG. 5 is a block diagram showing a configuration example of pulse detector 124.

In FIG. 5, pulse detector 124 has: envelope detector 1241 that outputs the envelope of the pulse signal from low noise amplifier 123; integrator 1242 that integrates the envelope on a per time slot basis (i.e. pulse interval); and comparator 1243 that compares an integrated value, which is an output of integrator 1242, and a threshold voltage (i.e. threshold) V1 and outputs detected data D1. Meanwhile, the threshold voltage V1 is held in a threshold holder (not shown).

Back to FIG. 4, second terminal 200 has transmitting section 110, receiving section 120, transmitting antenna 216 and receiving antenna 221. Transmitting antenna 216 and receiving antenna 221 have the same functions as transmitting antenna 116 and receiving antenna 121. Further, internal configurations of transmitting section 110 and receiving section 120 of second terminal 200 are not disclosed but are configured the same as transmitting section 110 and receiving section 120 of first terminal 100.

Next, the operations of transmitting section 110 of first terminal 100 and receiving section 120 of second terminal 200 will be described with reference to FIG. 4 and FIG. 5.

[The Operation of the Transmitting Section of the First Terminal]

First, the operation of transmitting section 110 of first terminal 100 will be described. First, mapping section 112 allocates pulse codes of "0" or "1" to transmission data T1 held in transmission data holding section 111 and outputs transmission data T1 to pulse modulator 113.

Next, pulse modulator 113 modulates the pulse codes to pulses with a predetermined pulse width according to the OOK scheme. The pulse width in this case is set to be narrower than a time slot. For example, when the bit rate (i.e. coding rate) is 1 Gbps, although the time slot is 1 nsec, the pulse width of the pulse codes is modulated by pulse modulator 113 to be smaller than 1 nsec.

Further, with the present embodiment, given that the OOK scheme is employed for pulse modulation, pulse modulator 113 outputs a pulse with a pulse width narrower than 1 nsec if the pulse code is "1," and, on the other hand, does not output anything if the pulse code is "0."

Next, amplifier 114 amplifies pulses modulated by pulse modulator 113 to a predetermined power level and outputs the result to filter 115. Then, the pulses amplified by amplifier 114 pass filter 115 and then are output in the air through transmitting antenna 116.

Next, when the retransmission control signal D3 (described later) is input from second terminal 200 to transmission data holding section 111 and mapping section 112 through antenna 121 of first terminal 100, mapping section 112 extracts again transmission data T1 from transmission data holding section 111.

Then, mapping section 112 allocates pulse codes of "0" or "1" to transmission data T1 and outputs transmission data T1 to pulse modulator 113. Mapping section 112 in this case inverts and re-encodes the pulse codes allocated to transmission data T1. For example, the basic pulse codes allocated to transmission data T1 are "10011" and the pulse codes that invert "10011" are "101100."

Further, pulse modulator 113, amplifier 114, filter 115 and transmitting antenna 116 carry out a series of the above processings with respect to the pulse codes re-encoded in mapping section 112. By this means, the re-encoded pulses are output in the air.

[The Operation of the Receiving Section of the Second Terminal]

Next, the operation of receiving section 120 of second terminal 200 will be described. First, pulses output in the air are received by receiving antenna 221, then pass filter 122 and are input to low noise amplifier 123.

Next, low noise amplifier 123 amplifies the pulses that pass filter 122, to a predetermined power level and outputs the result to pulse detector 124.

Then, in pulse detector 124, first, envelope detector 1241 outputs the envelope of the amplified pulses to integrator 1242. Then, integrator 1242 integrates the envelope on a per time slot basis. Then, comparator 1243 compares an integrated value (i.e. output value) of integrator 1242 and the threshold voltage V1 set in advance, and outputs first received data R1 shown by detected data to switch 125 according to the comparison result.

For example, if the integrated value is greater than the threshold voltage V1, integrator 1242 outputs data "1" to applicable time slots and, on the other hand, if the integrated value is V1 or less, integrator 1242 outputs data "0" to applicable time slots.

Switch 125 sequentially outputs first received data R1 included in detected data D1 to first data holding section 126 such that first data holding section 126 holds first received data R1.

Next, error detecting section 129 extracts first received data R1 from first data holding section 126, and acquires comparison result information D2 showing the comparison result (XOR) of the bits of each time slot of both received data R1 and R2.

Code comparing section 128 compares first received data R1 and second received data R2 (described later) and outputs the above comparison result information D2 to error detecting section 129. However, at this point in time, given that there is no second received data R2, the comparison result D2 in code comparing section 128 shows processing error (for example, all codes are 0).

Error detecting section 129 detects code errors from comparison result information D2 from code comparing section 128 and outputs the result to data controlling section 130. Then, in response to the detection result (for example, error processing and code error) from error detecting section 129, data controlling section 130 outputs to first terminal 100, the retransmission control signal D3 for making first terminal 100 retransmit transmission data T1. Further, data controlling section 130 outputs the retransmission control signal D3 to switch 125, and switch 125 changes the destination at which the retransmission control signal D3 is stored, to second data holding section 127.

First terminal 100 that receives the retransmission control signal D3 through receiving antenna 121, retransmits pulses that invert codes for transmission data T1, to second terminal 200 by a series of the above processings of mapping section 112, pulse modulator 113, amplifier 114, filter 115 and transmitting antenna 116.

The retransmitted pulses (i.e. pulses subjected to bit inversion) are received through receiving antenna 221 of second terminal 200. Further, filter 122, low noise amplifier 123 and pulse detector 124 of second terminal 200 carry out the above processings of the pulses. By this means, second received data R2 for the pulses retransmitted in pulse detector 124 of second terminal 200 is output to switch 125. Then, switch 125 makes second data holding section 127 hold second received data R2.

Next, code comparing section 128 extracts first received data R1 and second received data R2 from first data holding section 126 and second data holding section 127, respectively, and compares the bits of both received data based on XOR. Further, code comparing section 128 outputs comparison result information D2 showing the result, to error detecting section 129.

Error detecting section 129 detects code errors from the XOR shown in the above comparison result information D2. This detection example will be described with reference to FIG. 6.

Figure 6:
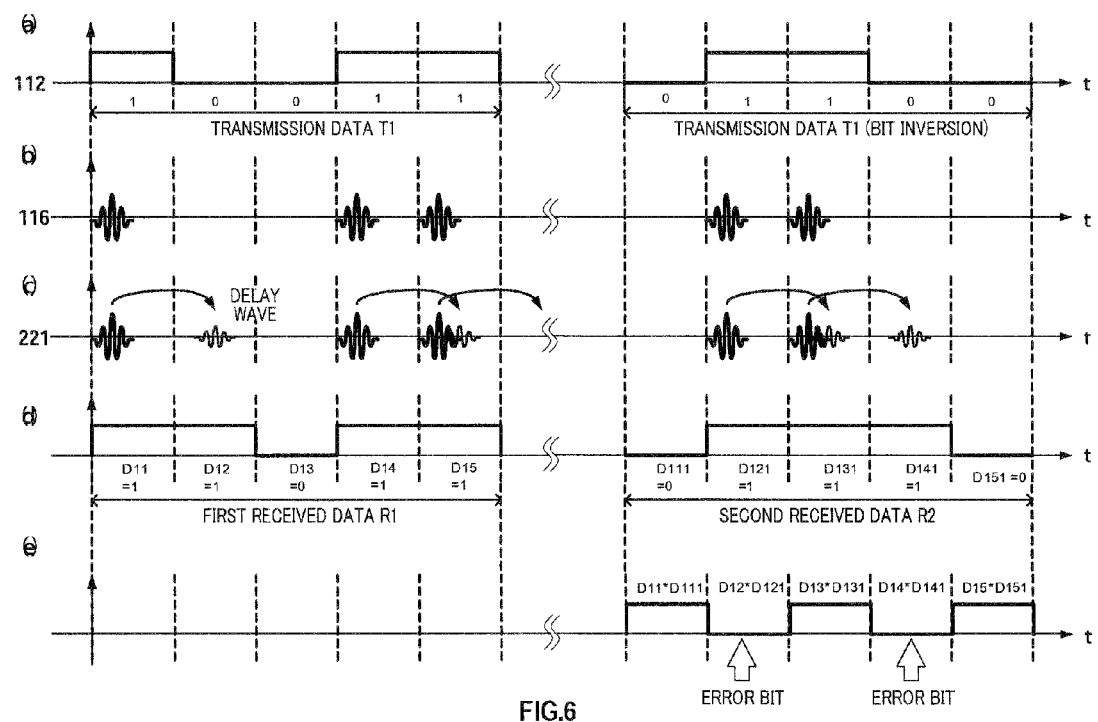
FIG. 6 shows an example of output waveforms of a transmitting section of a first terminal and a receiving section of a second terminal.

FIG. 6 shows an example of output waveforms of transmitting section 110 of first terminal 100 and receiving section 120 of second terminal 200. For ease of description, these output waveforms are shown without taking into account the delay time in the channel and signal processing circuit.

The data signal sequence shown in FIG. 6(a) shows pulse codes encoded from transmission data T1 in mapping section 112 of first terminal 100, and the pulse codes of "01100" follow "10011." "01100" is shown as a re-encoded combination of transmission data T1. That is, "01100" is formed by inverting the bits of "10011" encoded upon the first time.

The transmission signal waveform shown in FIG. 6(b) shows pulses output through transmitting antenna 116 of first terminal 100. This transmission signal waveform is acquired from the data signal sequence of "10011" and "01100" shown in FIG. 6(a).

The received signal waveform shown in FIG. 6(c) shows pulses when the transmission signal waveform shown in FIG. 6(b) is received by receiving antenna 221 of second terminal 200. Delay waves are also delayed by a predetermined period and are shown here.

Meanwhile, a case is assumed in FIG. 6(c) where, for example, the relationships between the positions of first terminal 100 and second terminal 200 do not change and the surrounding environment does not change, times at which delay waves arrive are constant.

Detected data D1 shown in FIG. 6(d) is data output from pulse detector 124 of second terminal 200. In FIG. 6(d), first received data R1 and subsequent second received data R2 are included in detected data D1. In this case, first received data R1 is formed with, for example, five time slots D11 to D15, and second received data R2 is formed with, for example, five time slots D111 to D151. Second time slot D12 in first received data R1 must be "0" fundamentally, but shows "1," due to the influence of delay waves because of the following reason.

That is, the reason is that power detection is carried out taking into account the envelopes of delay waves in envelope detector 1241 of pulse detector 124.

For the same reason, fourth time slot D141 in second received data R2 shows "1," due to the influence of delay waves.

Comparison result information D2 shown in FIG. 6(e) is output from code comparing section 128 of second terminal 200 to error detecting section 129. In FIG. 6(e), as comparison result information D2, the XOR's of first received data R1 and second received data R2 are shown. To be more specific, (D11*D111)=1, (D12*D121)=0, (D13*D131)=1, (D14*D141)=0 and (D15*D151)=1 are shown.

In this case, given that second received data R2 is formed by inverting the codes of first received data R1, if there is no error in the codes, the XOR's of first detected data R1 and second detected data R2 are all "1." Consequently, if the XOR's show "0," error detecting section 129 detects an error of the applicable time slot. In FIG. 6(e), given that the XOR's of the second time slot and fourth time slot show "0" (values showing an error), error detecting section 129 is able to detect code errors of these time slots. Further, even if a delay wave becomes wider than a time slot and arrives, given that code errors are detected from the XOR's of time slots, so that it is possible to accurately detect the code errors in such a case. Meanwhile, the number of bit errors in this case is two.

Although a case has been described with Embodiment 1 where transmitting section 110 of first terminal 100 receives an input of the retransmission control signal D3 and retransmits re-encoded pulses to second terminal 200, the re-encoded pulses may be retransmitted at the same time when the pulses encoded for the first time are transmitted without receiving as input the retransmission control signal D3.

Further, given that the intensity of a radio wave input to receiving antenna (receiving terminal) 121 varies depending on the distance between first terminal 100 and second terminal 200, the intensity of a signal input to pulse detector 124 may be kept constant by controlling the amplification factor of low noise amplifier 123.

Although a plurality of delay waves are input to receiving antenna 121 at all times in a closed space such as a room, it is possible to provide such a condition where there is only one delay wave that influences demodulated data, by using a directive antenna of a narrow antenna beam angle.

Embodiment 2

Embodiment 2 differs from Embodiment 1 where detected data is acquired using one threshold voltage V1, in acquiring detected data using two different threshold voltages V1 and V2 (for example, V1<V2). V1 will be referred to as "the first threshold voltage" and V2 will be referred to as "the second threshold voltage" below.

First terminal 100 and second terminal 200 in Embodiment 2 have receiving section 120A instead of receiving section 120 in Embodiment 1. Therefore, the configuration of receiving section 120A of first terminal 100 will be focused upon and described below.

Figure 7:
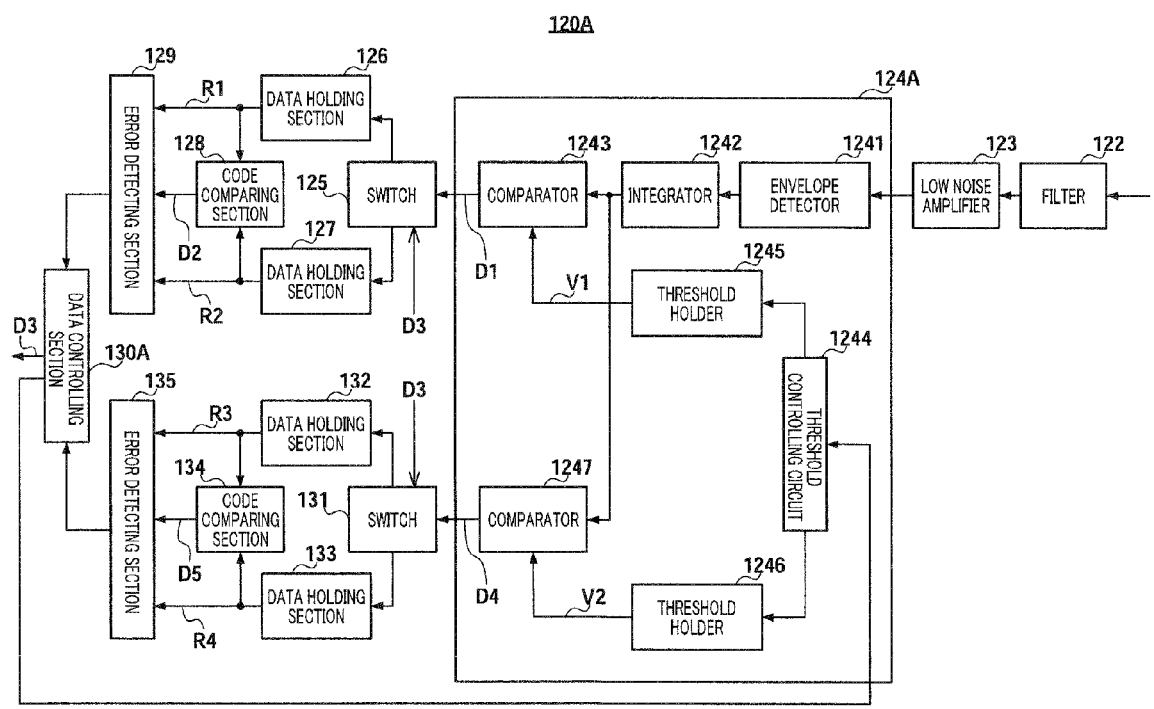
FIG. 7 is a block diagram showing a configuration example of the receiving section according to Embodiment 2 of the present invention.

FIG. 7 is a block diagram showing a configuration example of receiving section 120A according to Embodiment 2 of the present invention. Meanwhile, in Embodiment 2, the same reference numerals will be assigned to the same parts as in Embodiment 1 and repetition of description will be omitted.

Receiving section 120A shown in FIG. 7 has pulse detector 124A and data controlling section 130A instead of pulse detector 124 and data controlling section 130 in Embodiment 1.

Pulse detector 124A is configured to acquire two items of detected data using two different threshold voltages V1 and V2. To be more specific, in addition to envelope detector 1241, integrator 1242 and comparator 1243 (which will be referred to as "first comparator 1243" with the present embodiment) in Embodiment 1, pulse detector 124A further has threshold controlling circuit (threshold controlling section) 1244, first threshold holder 1245, second threshold holder 1246 and second comparator 1247.

Threshold controlling circuit 1244 controls values of the first threshold voltage V1 and second threshold voltage V2. Further, threshold controlling circuit 1244 registers the first threshold voltage V1 in first threshold holder 1245 and registers the second threshold voltage V2 in second threshold holder 1246.

Second comparator 1247 extracts an integrated value of integrator 1242, compares the integrated value and the second threshold voltage V2 of second threshold holder 1246 and outputs second detected data D4. The method of acquiring second detected data D4 is the same as in first comparator 1243. Further, with the present embodiment, detected data D1 in Embodiment 1 will be referred to as "first detected data D1."

Further, receiving section 120A has switch 131 that changes the destination at which second detected data D4 is held, to third data holding section 132 or fourth data holding section 133. With the present embodiment, third received data R3 (matching pulses encoded from transmission data T1) acquired from second detected data D4 is held in third data holding section 132. Further, fourth received data R4 (matching pulses re-encoded from transmission data T1) acquired from second detected data D4 is held in fourth data holding section 133.

Further, receiving section 120A has: third holding section 132; fourth holding section 133; second code comparing section 134 that compares (for example, XOR) the codes of both received data R3 and R4 held in third holding section 132 and fourth holding section 133; and second error detecting section 135 that detects code errors from comparison result information D5 in code comparing section 134.

Further, instead of data controlling section 130 in Embodiment 1, data controlling section 130A outputs the retransmission control signal D3 for retransmitting transmission data T1 based on each detection result information in first error detecting section 129 and second error detecting section 135. The output destinations of the retransmission control signal D3 are, for examples, transmitting section 110 (transmission data holding section 111 and mapping section 112) of second terminal 200 and switch 125 and 131 of first terminal 1.

The other configurations of first terminal 100 and second terminal 200 including transmitting section 110 are configured in the same way as in Embodiment 1.

Next, an example of code error detection in second error detecting section 135 will be described with reference to FIG. 8.

Figure 8:
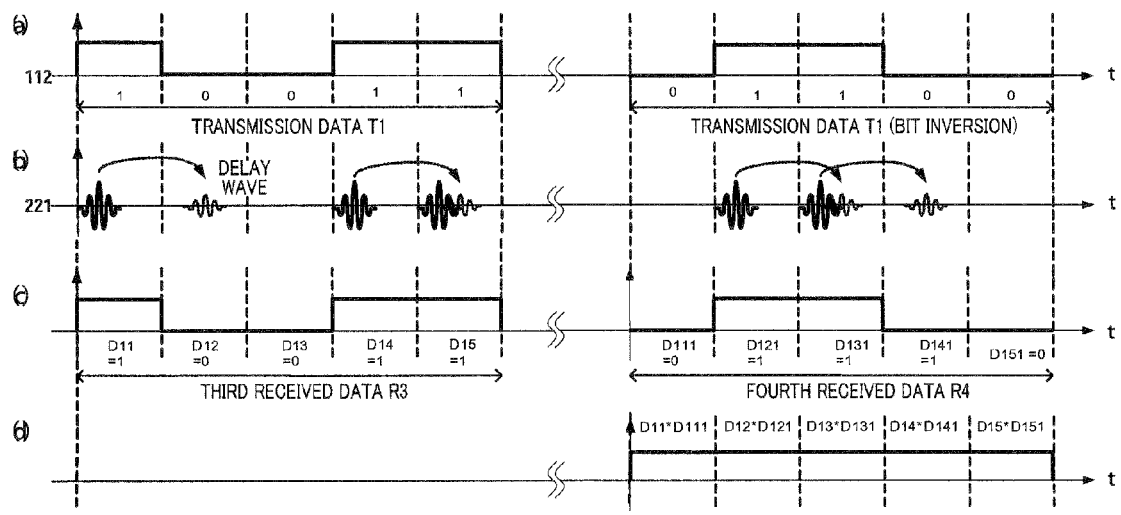
FIG. 8 shows an example of output waveforms of the transmitting section of the first terminal and the receiving section of the second terminal.

FIG. 8 shows an example of output waveforms of transmitting section 110 of first terminal 100 and receiving section 120A of second terminal 200. Meanwhile, the data signal sequence shown in FIG. 8(a) is the same as the data signal sequence shown in FIG. 6(a), and the received signal waveform shown in FIG. 8(b) is the same as the received signal waveform shown in FIG. 6(c).

Second detected data D4 shown in FIG. 8(c) is output from second comparator 1247 of second terminal 200. FIG. 8(c) shows the above third received data R3 and fourth received data R4 following the third received data R3. In this case, differing from the case of FIG. 6(d), third received data R3 and fourth received data R4 both show "0" without being influenced by delay waves because of the following reason. That is, the reason is that, even if the integrated value of integrator 1242 is decided to be greater than V1 in first comparator 1243, the integrated value of integrator 1242 is decided to be equal to or less than V2 in second comparator 1247.

Comparison result information D5 shown in FIG. 8(d) is output from second code comparing section 134 of second terminal 200 to second error detecting section 135. In FIG. 8(d), although the XOR's of third received data R3 and fourth received data R4 are shown as the comparison result D5 are all "1," differing from the case of FIG. 6(e). Consequently, second error detecting section 135 does not detect errors in time slots. In this way, it is possible to avoid code errors due to delay waves by generating detected data using two threshold voltages.

However, if threshold voltages V1 and V2 are both set too high in case of a low SN ratio, time slots in which there are pulses are output as "0" due to the influence of noise of pulses in code bits and code errors are more likely to occur. The threshold voltage needs to be set to an optimal value, and so this point will be described below.

Figure 9:
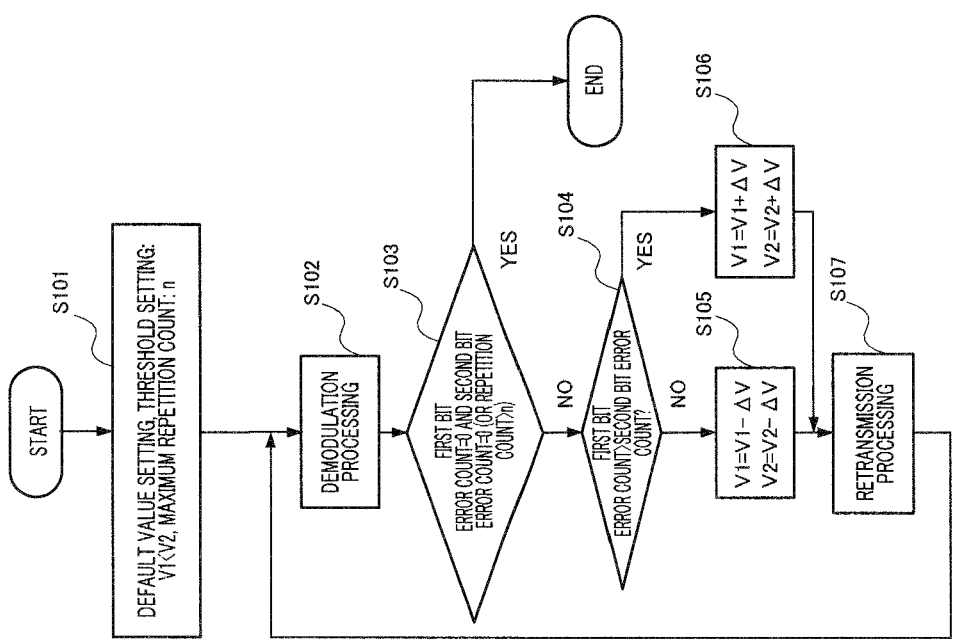
FIG. 9 is a flowchart showing an example of control of a threshold voltage value of the receiving section according to Embodiment 2.

FIG. 9 is a flowchart showing processing of setting an optimal threshold voltage in receiving section 120A of second terminal 200.

In step S101, threshold controlling circuit 1244 of receiving section 120A sets default values. The default values include, for example, threshold voltages V1 and V2 (for example, V1<V2) and the maximum repetition count "n." The repetition count in this case refers to numbers of times the threshold voltages V1 and V2 change.

In step S102, receiving section 120A carries out demodulation processing. To be more specific, in first error detecting section 129, code errors are detected based on comparison result information D2 (see FIG. 6(e): not including the first error processing), and, then, in second error detecting section 135, code errors are detected based on comparison result information D5 (see FIG. 8(d): not including the first error processing). Then, data controlling section 130A receives as input detection result information (including each bit error count) from both error detecting sections 129 and 135, and outputs the detection result information to threshold controlling circuit 1244. Meanwhile, the bit error count input from first error detecting section 129 will be referred to as the "first bit error count" and the bit error count input from second error detecting section 135 will be referred to as the "second bit error count."

In step S103, threshold controlling circuit 1244 decides whether or not the condition of the first bit error count=0 and the second bit error count=0 is satisfied, based on the above detection results input from data controlling section 130A. As a result, if the condition is satisfied ("Yes" in S103), the processing is finished, and, on the other hand, if the condition is not satisfied ("No" in S103), the flow proceeds to step S104. Meanwhile, in step S103, in case of the repetition count>n, the processing is also finished.

In step S104, if the condition of the first bit error count>the second bit error count is not satisfied based on the above detection results ("No" in S104), threshold controlling circuit 1244 configures the condition so as to satisfy V1=V1−ΔV (where ΔV is a value set in advance) and V2=V2−ΔV (step S105), and the flow proceeds to step S107. On the other hand, if the condition of the first bit error count>the second bit error count is satisfied ("Yes" in S104), threshold controlling circuit 1244 configures the condition so as to satisfy V1=V1+ΔV and V2=V2+ΔV (step S106), and the flow proceeds to step S107.

In step S107, data controlling section 130A carries out retransmission processing of outputting the retransmission control signal D3 and retransmitting transmission data T1, and, back to step S102, carries out demodulation processing of the retransmitted data signal sequence. Meanwhile, in step S107, data controlling section 130A outputs the retransmission control signal D3 to two switches 125 and 131.

In this way, in receiving section 120A, by increasing and decreasing the threshold voltages V1 and V2, optimal values for threshold voltages V1 and V2 are searched for. For example, in step S103, if the condition of the first bit error count=0 and the second bit error count=0 is satisfied, it is possible to set the average value of threshold voltages V1 and V2 thereof as an optimal threshold voltage.

Meanwhile, although a case has been described with Embodiment 2 where two different threshold voltages V1 and V2 are used, three or more different threshold voltages may be applied. In this case, it is possible to produce an advantage of determining the optimal threshold voltage at more ease.

Furthermore, although a case has been described with Embodiment 2 where first error detecting section 129 and second error detecting section 135 each detect code errors, one error detecting section may be used to detect respective errors. In this case, comparators and switches may be shared in one error detecting section.

Embodiment 3

Embodiment 3 differs from Embodiments 1 and 2 where encoding is carried out using an RZ (return to zero) code to a time slot of one bit, in carrying out encoding using a Manchester code for dividing the time slot of one bit into two and inserting codes which invert bits. That is, in mapping section 112 (see FIG. 4) of transmitting section 110, transmission data T1 is encoded using the Manchester code. For example, mapping section 112 allocates codes of "10" if transmission data is "0" and, on the other hand, allocates codes of "01" if transmission data is "1." The other configuration of transmitting section 110 is the same as in Embodiments 1 and 2.

Next, the configuration of the receiving section according to Embodiment 3 will be described. First terminal 100 and second terminal 200 in Embodiment 3 have receiving section 120B instead of receiving section 120 in Embodiment 1. Receiving section 120B will be focused upon and described below.

Figure 10:
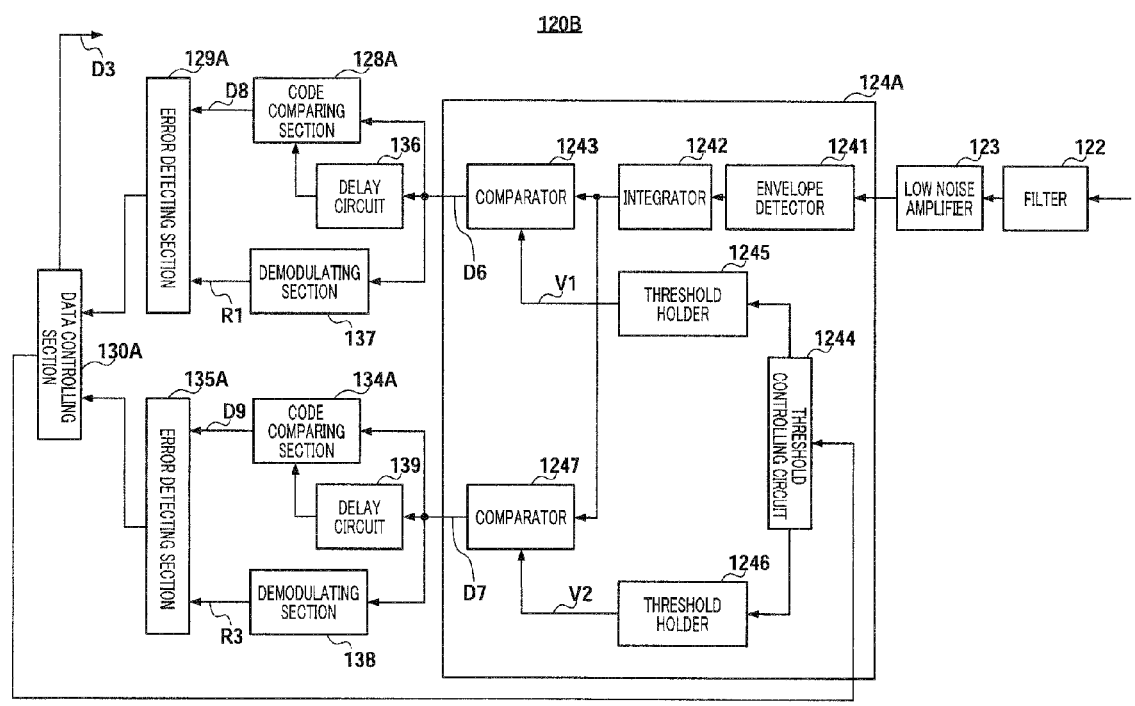
FIG. 10 is a block diagram showing a configuration example of the receiving section according to Embodiment 3 of the present invention.

FIG. 10 is a block diagram showing a configuration example of receiving section 120B according to Embodiment 3 of the present invention. Meanwhile, in Embodiment 3, the same reference numerals will be assigned to the same parts as in Embodiments 1 and 2 and repetition of description will be appropriately omitted.

Receiving section 120B shown in FIG. 10 has first code comparing section (comparator) 128A, first delay circuit (delaying section) 136 and first demodulating section 137. First delay circuit 136 delays first detected data D6 (corresponding to first detected data D1 of FIG. 7) from first comparator 1243 by a predetermined period (for example, time slot T/2) and outputs first detected data D6 to first code comparing section 128A.

First code comparing section 128A compares (for example, XOR) delay waves of first detected data D6 delayed in first delay circuit 136 and first detected data D6 from first comparator 1243, and outputs comparison result information D8 showing the result, to first error detecting section 129A.

First demodulating section 137 extracts first received data R1 from first detected data D6 and outputs first received data R1 to first error detecting section 129A. Although, with the present embodiment, first demodulating section 137 extracts first received data R1 from first detected data D6 based on the bit (i.e. polarity) of the first half (i.e. the first division of the Manchester code) of a time slot, first demodulating section 137 may extract first received data R1 based on the bit ("0" or "1") of the second half (i.e. the second division of the Manchester code) of the time slot.

Further, although receiving section 120B has second code comparing section (comparator) 134A, second delay circuit 139 and second demodulating section 138, these carry out processings based on second detected data D7 from second comparator 1247. That is, second delay circuit 139 delays second detected data D7 (corresponding to second detected data D4 of FIG. 7) from second comparator 1247 by a predetermined period (for example, time slot T/2) and outputs second detected data D7 to second code comparing section 134A. Second code comparing section 134A compares (for example, XOR) delay waves of second detected data D7 delayed in second delay circuit 139 and second detected data D7 from second comparator 1247, and outputs comparison result information D9 showing the result, to second error detecting section 135A.

Second demodulating section 138 extracts third received data R3 from second detected data D7 and outputs third received data R3 to second error detecting section 135A. In this case, second demodulating section 138 extracts third received data R3 from second detected data D7 based on the bit of the first half (i.e. the first division of the Manchester code) of a time slot. Further, second demodulating section 138 may extract third received data R3 based on the bit of the second half (i.e. the second division of the Manchester code) of a time slot. Furthermore, the above two delay circuits, demodulating sections and error detecting sections may be integrated and shared to carry out processings.

The other configurations of first terminal 100 and second terminal 200 including receiving section 120B are configured in the same way as in Embodiment 2.

Next, an example of code error detection in first error detecting section 129A will be described with reference to FIG. 11.

Figure 11:
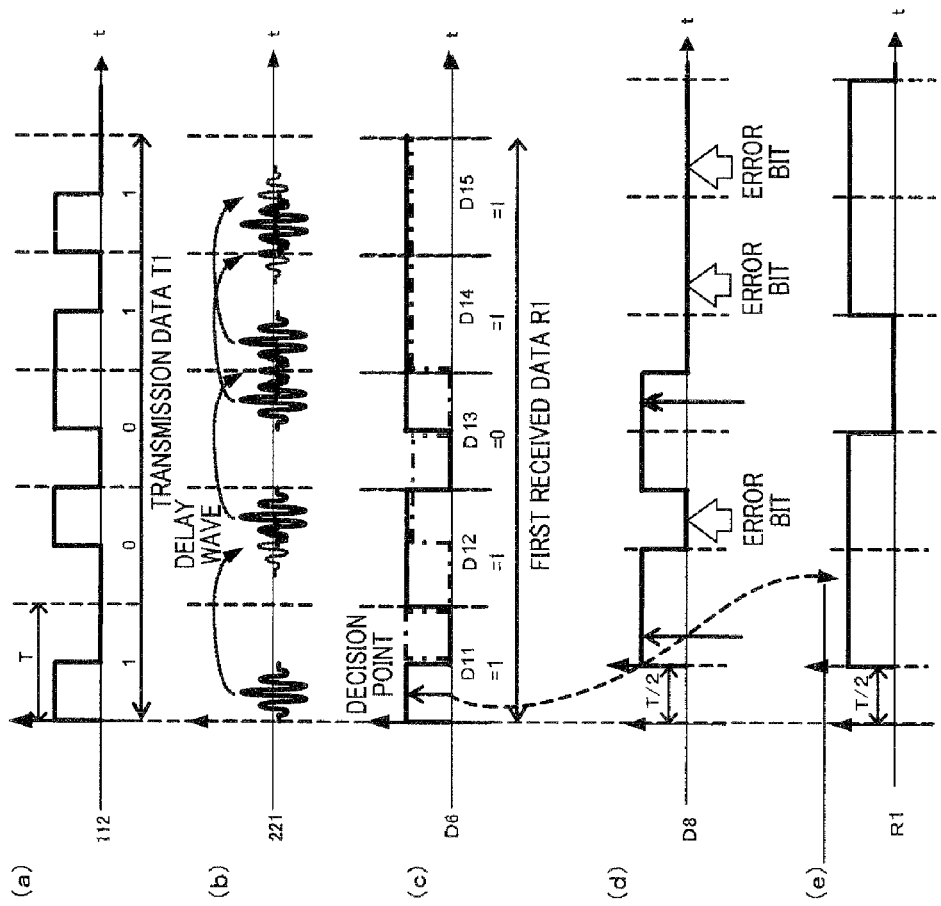
FIG. 11 shows an example of output waveforms of the transmitting section of the first terminal and the receiving section of the second terminal.

FIG. 11 shows an example of output waveforms of transmitting section 110 of first terminal 100 and receiving section 120B of second terminal 200.

The data signal sequence shown in FIG. 11(a) shows pulse codes of "10001" encoded from transmission data T1 in mapping section 112 of first terminal 100 using the Manchester code. The time slot T is divided into two by the center, and the bit of the second division which inverts the bit of the first division is shown.

The transmission signal waveform shown in FIG. 11(b) is pulses received from receiving antenna 221 of second terminal 200. As in the case of FIG. 6(c), this transmission signal waveform includes delay waves which have arrived with a predetermined period of delay.

First detected data D6 (solid line) shown in FIG. 11(c) is data output from first comparator 1243 of second terminal 200. First received data R1 (described later) can be acquired from this detected data D6. In FIG. 11(c), bits of "0" or "1" shown in FIG. 11(b) are shown in time slots D11 to D15 of first received data R1 depending on whether or not there is a pulse. Further, the first division of the second time slot D12, the second division of the fourth time slot D14 and the second division of the fifth time slot D15 fundamentally show "0" but show "1" due to the influence of delay waves.

Furthermore, the dotted line shown in FIG. 11(c) shows first detected data D6 delayed by T/2 in first delay circuit 136.

Comparison result information D8 shown in FIG. 11(d) is output from first code comparing section 128A of second terminal 200 to first error detecting section 129A. In FIG. 11(d), the XOR's ("0" or "1") of first detected data D6 (see the solid line of FIG. 11(c)) and a delay wave (see the dotted line of FIG. 11(c)) that delays first detected data D6 by T/2 are shown as comparison result information D8.

In this case, given that the data signal sequence shown in FIG. 11(a) is shown by the Manchester code which inverts the bits of the first division and the second division in the time slot, if there is no bit error, the above XOR's all show "1." Consequently, if the XOR shows "0," first error detecting section 129A detects a code error in the time slot. In FIG. 11(d), the XOR's of first divisions in the second time slot, fourth time slot and fifth time slot show "0." Consequently, first error detecting section 129A detects code errors of these time slots.

First received data R1 shown in FIG. 11(e) is extracted from first detected data D6 (solid line) shown in FIG. 11(c) in first demodulating section 137. Meanwhile, first received data R1 is extracted based on the bits (see the arrows showing decision points of FIG. 11(c)) of the first halves of the first to fifth symbols D11 to D15 in first detected data D6. Consequently, first received data R1 is formed with the codes of "11011."

Next, an example of code error detection in second error detecting section 135A will be described with reference to FIG. 12.

Figure 12:
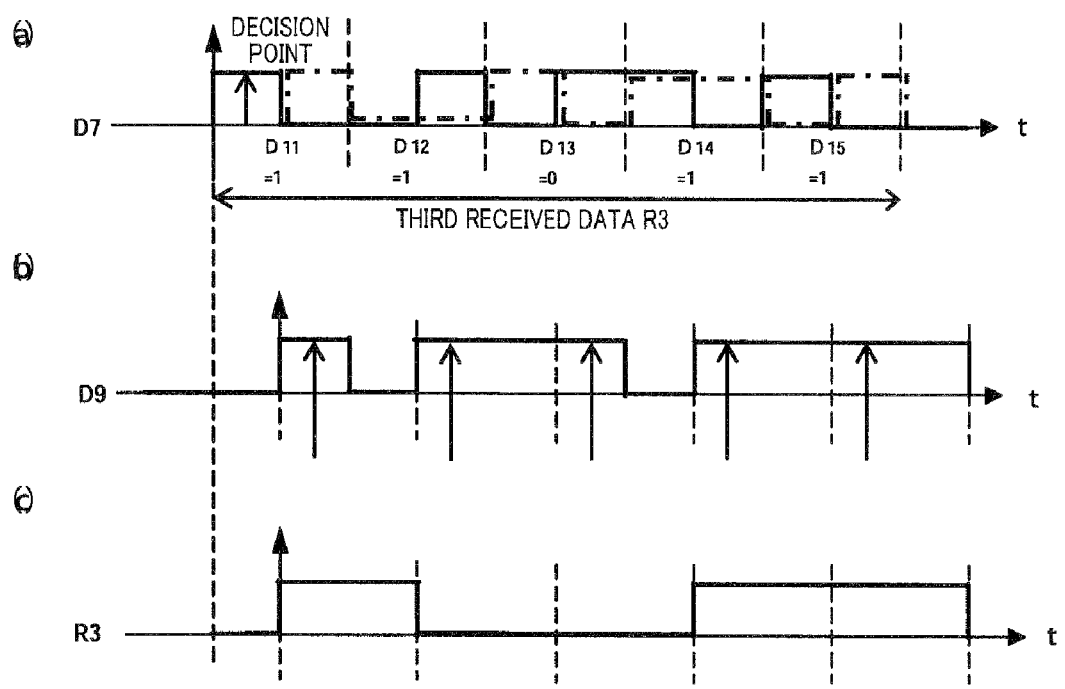
FIG. 12 shows an example of output waveforms of the receiving section of the second terminal according to Embodiment 3.

FIG. 12 shows an example of output waveforms of receiving section 120B of second terminal 200. Meanwhile, the data signal sequence and transmission signal waveform in this case are as shown in FIG. 11(a) and FIG. 11(b).

Second detected data D7 (solid line) shown in FIG. 12(a) is data output from second comparator 1247 of second terminal 200. Third received data R3 (described later) can be acquired from this detected data D7. In FIG. 12(a), bits of "0" or "1" shown in FIG. 11(b) are shown in time slots D11 to D15 in third received data R3 depending on whether or not there is a pulse. As in the case of Embodiment 2, in FIG. 12(a), V1<V2, so that detected data D7 acquired based on V2 is not influenced by delay waves such as multipath, and bits are shown in symbols D11 to D15.

Meanwhile, the dotted line shown in FIG. 12(a) shows second detected data D7 delayed by T/2 in second delay circuit 139.

Comparison result information D9 shown in FIG. 12(b) is output from second code comparing section 134A of second terminal 200 to second error detecting section 135A. In FIG. 12(b), the XOR's ("0" or "1") of second detected data D7 (see solid line of FIG. 12(a)) and a delay wave (see the dotted line of FIG. 12(a)) which delays second detected data D7 by T/2 are shown as comparison result information D9. However, differing from the case of FIG. 11(c), the first half of the time slots all show "1." Consequently, second error detecting section 135A does not detect code errors in time slots.

Third received data R3 shown in FIG. 12(c) is extracted from second detected data D7 (solid line) shown in FIG. 12(a) in second demodulating section 138. By so doing, in addition to the advantage of Embodiment 2, it is possible to detect bit errors in receiving section 120B by using the Manchester code which inverts bits in a time slot, without retransmitting a bit inverted code of transmission data T1 in transmitting section 110.

Meanwhile, the same configuration as in Embodiment 2 has been described with Embodiment 3 where code errors are detected based on two items of detected data acquired from two different threshold voltages V1 and V2, the present embodiment may be configured in the same way as in Embodiment 1 where code errors are detected based on detected data acquired from one threshold voltage V1. In this case, it is possible to detect bit errors in receiving section 120B by employing the Manchester code, without retransmitting a bit inverted code of transmission data T1 in transmitting section 110.

Embodiment 4

Figure 13:
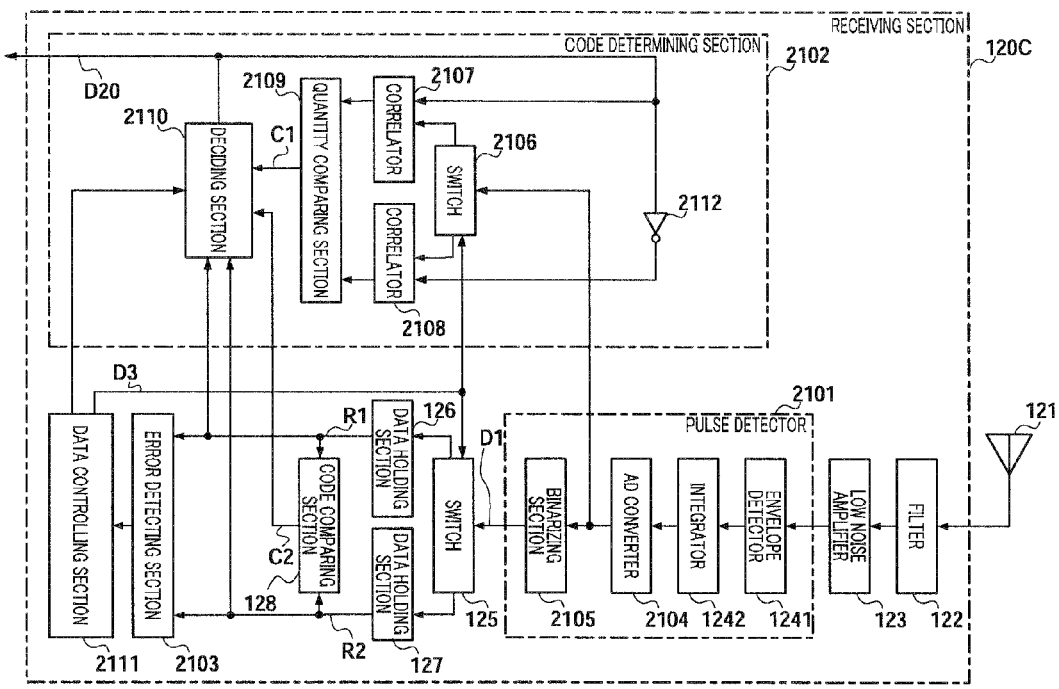
FIG. 13 is a block diagram showing a configuration example of the receiving section according to Embodiment 4 of the present invention.

FIG. 13 is a block diagram showing a configuration example of the receiving section according to Embodiment 4 of the present invention. Meanwhile, the transmitting section according to the present invention has the same configuration as the transmitting section according to Embodiment 1, and so repetition of description will be omitted.

In FIG. 13, compared to receiving section 120 according to Embodiment 1, receiving section 120C is configured including pulse detector 2101, error detecting section 2103 and data controlling section 2111 and further code determining section 2102, instead of pulse detector 124, error detecting section 129 and data controlling section 130.

Compared to pulse detector 124, pulse detector 2101 has AD converter 2104 and binarizing section 2105 instead of comparator 1243. Meanwhile, the same reference numerals as in FIG. 5 will be assigned to the configuration parts common to pulse detector 124 and repetition of description will be omitted. AD converter 2104 converts an integrated value (i.e. output value) of integrator 1242 into a digital value and outputs the digital value to binarizing section 2105 and switch 2106 of code determining section 2102 (described later). Binarizing section 2105 outputs one bit of the highest digit of the digital value input from AD converter 2104, to switch 125.

Error detecting section 2103 extracts first received data (i.e. detected data) R1 from first data holding section 126 or second received data (i.e. detected data) R2 from second data holding section 127, and carries out an error detection using frame check sequences included in R1 or R2. Error detecting section 2103 outputs a result of deciding whether or not there is an error, to data controlling section 2111.

If error detecting section 2103 decides that there is no error, data controlling section 2111 commands deciding section 2110 to output R1 (or inverted data of R2) as decoded data D20. On the other hand, if error detecting section 2103 decides that there is an error, data controlling section 2111 reports the transmission control signal D3 to first terminal 100 such that transmission data is retransmitted to first terminal 100. Further, data controlling section 2111 outputs the retransmission control signal D3 to switch 125 and switch 2106 of code determining section 2102 (described later).

Code determining section 2102 is configured including switch 2106, first correlator 2107, second correlator 2108, quantity comparing section 2109, deciding section 2110 and NOT element 2112.

Switch 2106 changes the destination at which an output of AD converter 2104 is held, to first correlator 2107 or second correlator 2108 depending on whether or not there is the retransmission control signal D3 from data controlling section 2111. To be more specific, when receiving as input the retransmission control signal D3 from data controlling section 2111, switch 2106 changes the destination at which an output of AD converter 2104 is stored, to second correlator 2108. That is, upon a reception of retransmission data, switch 2106 changes the destination at which an output of AD converter 2104 is stored, to second correlator 2108. Meanwhile, upon a reception of first data, switch 2106 changes the destination at which an output of AD converter 2104 is stored, to first correlator 2107.

Figure 14:
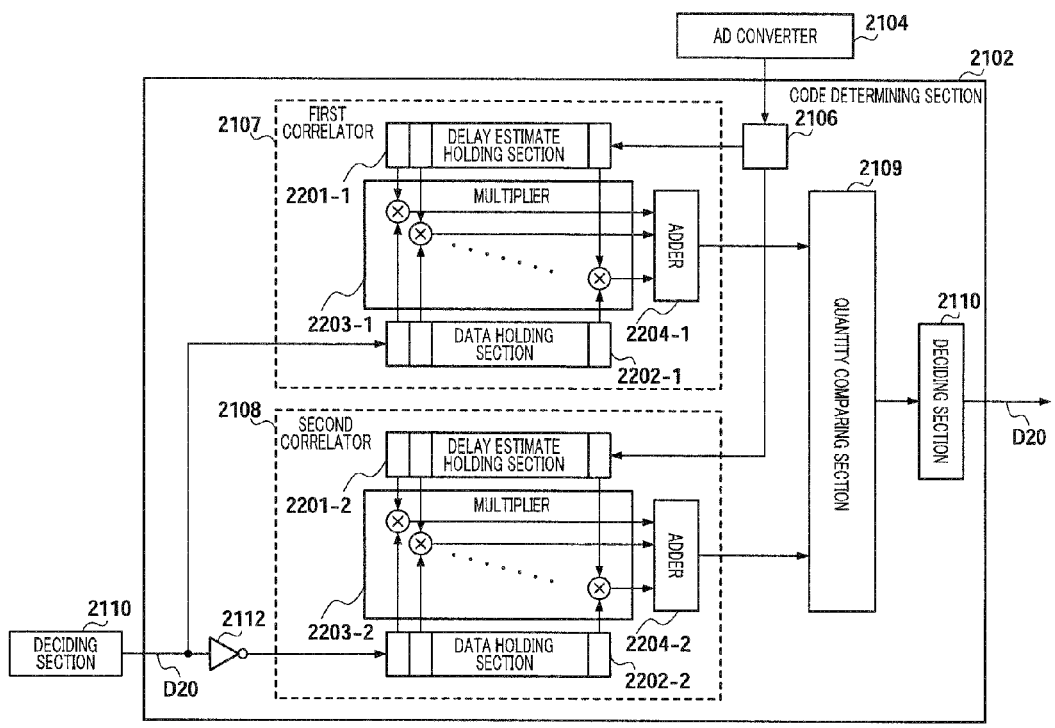
FIG. 14 is a block diagram showing a configuration example of a code determining section according to Embodiment 4.

FIG. 14 shows detailed configurations of first correlator 2107 and second correlator 2108. First correlator 2107 is configured including delay estimate holding section 2201-1, data holding section 2202-1, multiplier 2203-1 and adder 2204-1. Similarly, second correlator 2108 is configured including delay estimate holding section 2201-2, data holding section 2202-2, multiplier 2203-2 and adder 2204-2.

Delay estimate holding section 2201-1 holds a delay estimating sequence output from AD converter 2104 and outputs the delay estimating sequence to multiplier 2203-1. The delay estimating sequence refers to a sample value showing a delay time of the delay wave and a signal level of the delay wave and is acquired as detected data of an impulse signal (delay estimating symbol) included in a frame. In other words, the delay estimating sequence corresponds to a delay profile. This delay estimating sequence will be described later.

Data holding section 2202-1 holds data which have been determined so far and which are input from deciding section 2110 (hereinafter "past decoded data") and outputs data to multiplier 2203-1. Meanwhile, if a new frame is received, data holding section 2202-1 resets all data to zero.

Multiplier 2203-1 calculates the product of the delay estimating sequence and past data, and outputs the result to adder 2204-1. Adder 2204-1 adds all the calculation results input from multiplier 2203-1 and outputs the result to quantity comparing section 2109.

In this way, first correlator 2107 acquires a correlation operation result between the delay profile and past data.

The internal configuration parts of second correlator 2108 are the same as in first correlator 2107. Data holding section 2202-2 holds inverted data of past data output from NOT element 2112. Consequently, second correlator 2108 acquires a correlation operation result between the delay profile and inverted data of past data.

Quantity comparing section 2109 compares the quantities of an output of first correlator 2107 and an output of second correlator 2108 and outputs the comparison result C1 to deciding section 2110. Meanwhile, an example of the definition of C1 is shown in FIG. 15. In an example shown in FIG. 15, C1=0 if the output of first correlator 2107 is less than the output of second correlator 2108, and C=1 if the output of first correlator 2107 is equal to or greater than the output of second correlator 2108.

Deciding section 2110 decides whether the symbol to determine this time shows "1" or "0" based on the comparison result C1 from quantity comparing section 2109 and the code comparison result C2 from code comparing section 128, and outputs the result as decoded data D20.

Figure 16:
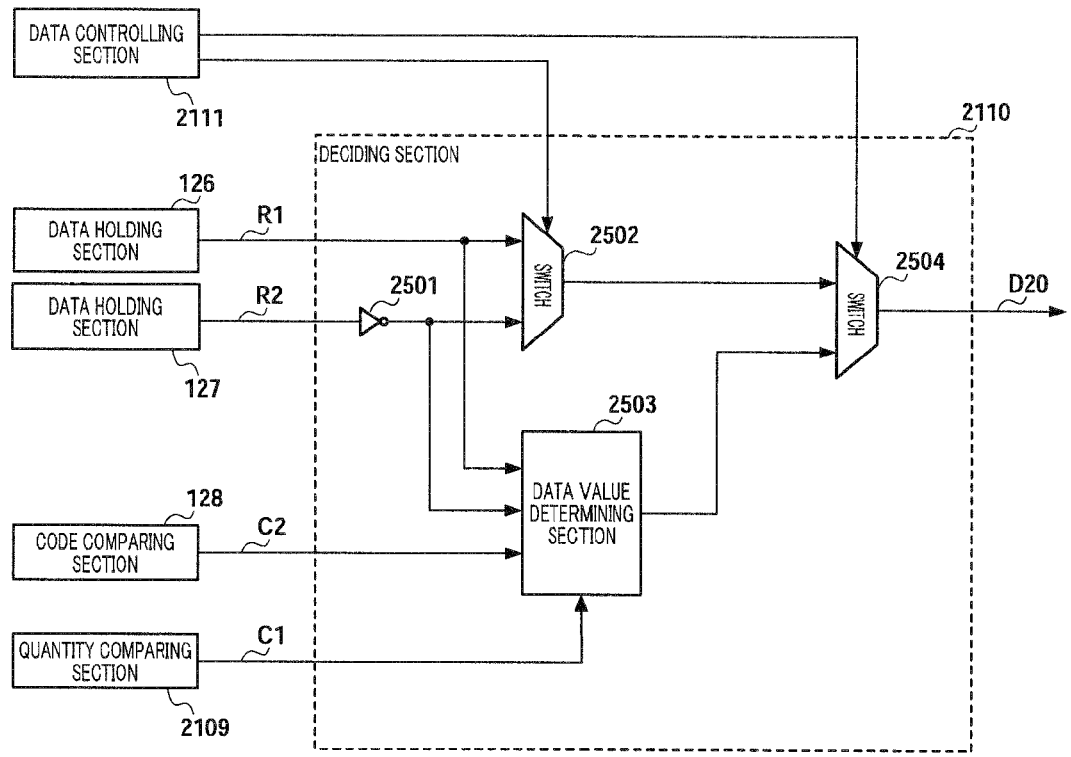
FIG. 16 is a block diagram showing a configuration example of a deciding section according to Embodiment 4.

FIG. 16 shows a configuration example of deciding section 2110. In FIG. 16, deciding section 2110 is configured including NOT element 2501, switch 2502, data value determining section 2503 and switch 2504.

NOT element 2501 inverts data input from second data holding section 127 and outputs the result to switch 2502. According to the command from data controlling section 2111, switch 2502 selects one of R1 and R2 inverted data and outputs the result to switch 2504. To be more specific, switch 2502 selects R1 upon the first transmission and selects inverted data of R2 upon a retransmission.

According to the comparison result C2 from code comparing section 128, data value determining section 2503 selects one of R1 and inverted data of R2 and outputs the result to switch 2504. To be more specific, if the comparison result C2 shows R1≠R2, data value determining section 2503 outputs R1 to switch 2504. On the other hand, if the comparison result C2 shows R1=R2, data value determining section 2503 selects one of R1 and inverted data of R2 based on the comparison result C1 of quantity comparing section 2109. To be more specific, data value determining section 2503 outputs R1 to switch 2504 if the comparison result C1 shows that the first correlation value is less than the second correlation value (C1=0), and outputs inverted data of R2 to switch 2504 if the comparison result C1 shows that the first correlation value is equal to or greater than the second correlation value (C1=1).

FIG. 17 shows the logic table of data value determining section 2503 in this case. According to the command from data controlling section 2111, switch 2504 selects one of the input from switch 2502 and the input from data value determining section 2503, and outputs the input as decoded data D20.

The operation of receiving section 120C configured as described above will be described focusing mainly upon the operation of code determining section 2102.

[Receiving Operation]

Receiving received data R1 upon the first transmission, switch 2106 of code determining section 2102 sequentially outputs the delay estimating sequence (i.e. delay estimating sample value) of the first received data included in the output of AD converter 2104 such that first correlator 2107 holds the delay estimating sequence. Error detecting section 2103 extracts first received data R1 from first data holding section 126, carries out an error detection using a frame check sequence included in R1 and outputs the error detection result to data controlling section 2111.

If no error is detected, data controlling section 2111 commands deciding section 2110 to output R1 as is as decoded data D20.

If an error is detected, data controlling section 2111 reports the retransmission control signal D3 to first terminal 100 to make first terminal 100 retransmit transmission data T1. Further, data controlling section 2111 outputs the retransmission control signal D3 to switch 125, and switch 125 changes the destination at which the output of binarizing section 2105 is stored, to second data holding section 127. Further, switch 2106 changes the destination at which an output of AD converter 2104 is stored, to second correlator 2108. Similar to Embodiment 1, first terminal 100 that receives the retransmission control signal D3 through receiving antenna 121, retransmits a pulse that inverts a code for transmission data T1, to second terminal 200 by a series of the above processings of mapping section 112, pulse modulator 113, amplifier 114, filter 115 and transmitting antenna 116.

Receiving received data R2 upon a retransmission, switch 2106 of code determining section 2102 outputs a delay estimating sequence (i.e. delay estimating sample value) of second received data included in an output of AD converter 2104 to second correlator 2108 such that second correlation 2108 holds the delay estimating sequence. Error detecting section 2103 extracts second received data R2 from second data holding section 127, carries out an error detection using a frame check sequence included in R2 and outputs the result of deciding whether or not there is an error, to data controlling section 2111.

If no error is detected, data controlling section 2111 commands deciding section 2110 to output data that inverts R2 as decoded data D20.

If an error is detected, data controlling section 2111 commands deciding section 2110 to execute the code determining operation (described later).

[Code Determining Operation]

The code determining operation of deciding section 2110 will be described with reference to the drawings. FIG. 18 shows a configuration example of transmission data T1 upon the first transmission and transmission data T2 upon a retransmission.

As shown in FIG. 18, transmission data T1 and T2 are each formed with: a synchronization pattern for acquiring frame synchronization; a guard symbol (all the guard intervals show zero) for preventing a synchronization pattern signal from superimposing the delay estimating symbol; a delay estimating symbol (i.e. impulse signal); data; and a frame check sequence for detecting data errors. The synchronization pattern, guard symbol and delay estimating symbol are the same between T1 and T2. As to data, the relationship between T1 and T2 is inverted. The frame check sequence is used to detect data errors, and it naturally follows that the frame check sequence varies between T1 and T2.

Meanwhile, the guard symbol length and delay estimating symbol length are determined such that the difference between the times the direct wave and delay waves arrive at the radio channel applying the present embodiment does not exceed both of the guard symbol length and delay estimating symbol length.

A case will be described below as an example where two delay waves occur in addition to the direct wave on the channel. FIG. 19 shows the output waveform of AD converter 2104 in this case. As shown in FIG. 19, when receiving section 120C receives a delay estimating symbol, in the output of AD converter 2104, the first delay wave appears at the timing, which is delayed by delay time DT from the direct wave, and, further, the second delay wave appears at the timing, which is delayed by delay time DT2 from the direct wave. Consequently, delay estimate holding sections 2201-1 and 2201-2 sequentially receive outputs of AD converter 2104, so that the signal levels of delay waves would be held during the period from the time the direct wave arrives to the time the delay wave arrives (symbol time accuracy). In this way, delay estimate sample values will be held in delay estimate holding sections 2201-1 and 2201-2.

As an example, FIG. 20 shows timings delay waves arrive when the delay estimating symbol length is six symbols. A case will be described below as an example where delay waves are formed with two components of a component (delay wave 1) that arrives two symbols behind the direct wave and a component (delay wave 2) that arrives four symbols behind the direct wave.

FIG. 20A shows only a reception result of a delay estimating symbol upon the first transmission in an output signal of AD converter 2104. Further, FIG. 20B shows only a reception result of the delay estimating symbol upon a retransmission. The present embodiment assumes that the condition of arrangement of radio channels in space does not change upon the first transmission and a retransmission. Consequently, levels and arrival times of delay waves do not change.

In the same figure, the vertical axis represents the reception level in symbol time units of the delay estimating sequence. Further, in the delay estimating sequence {X1(1), X1(2), X1(3), X1(4), X1(5)} upon the first transmission, X1(1) represents a reception level of a symbol immediately after the direct wave and X1(2) represents the reception level two symbol behind the direct wave. Furthermore, the numbers in the parentheses represent the delay time of delay waves in symbol units when the direct wave is used as the reference (i.e. zero). The same applies to the delay estimating sequence {X2(1) X2(2), X2(3), X2(4), X2(5)} upon a retransmission. Consequently, in FIG. 20, the reception level of "delay wave 1" is represented by X1(2) and X2(2) and the reception level of "delay wave 2" is represented by X1(4) and X2(4). In this case, the delay estimating sequence length is five symbols because a signal (X1(0), X2(0)) of the direct wave is not included in the delay estimating sequence. With the present example, given that the delay estimating symbol length is six symbols, five symbols obtained by subtracting the direct wave is the delay estimating sequence length.

Figure 21A:
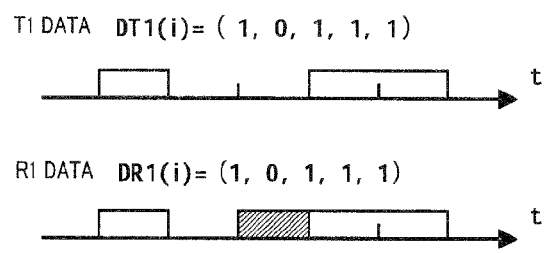
FIG. 21 shows transmission data and received data at each timing.
Figure 21B:
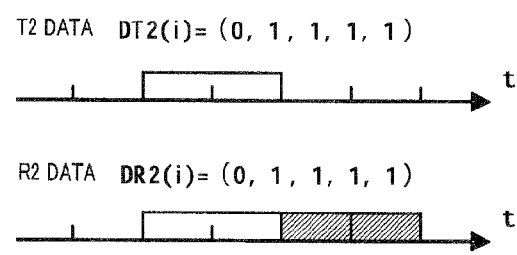

In FIG. 21A, T1 data (DT1($i$)) is transmission data upon the first transmission and R1 data (DR1($i$)) is received data upon the first transmission. Further, in FIG. 21B, T2 data (DT2($i$)) is transmission data upon a retransmission and R2 data (DR2($i$)) is received data upon a retransmission. The letter with parentheses "( )," for example, DT1($i$), represents an i-th symbol value from the left in the symbol values of DT1 shown in parentheses "{ }." Further, FIG. 21 shows an example of a case where the delay estimating sequence length is five symbols, and so i is a natural number between one and five.

Differing from Embodiment 1 that assumes delay waves with one symbol of delay, given that the present embodiment assumes delay waves formed with two components with two symbols and four symbols of delays, the situation in which an error occurs varies. That is, upon the first reception, due to the influence of the delay wave of transmission data DT1(1)=1, transmission data DT1(3)=0 changes to received data DR1(3)=1, thereby producing an error. Further, upon a reception of retransmission data, due to the influence of the delay wave of DT2(2), DT2(4)=0 changes to DR2(4)=1 and, due to the influence of the delay wave of DT2(3), DT2(5)=0 changes to DR2(5)=1, and errors occur respectively. In received data DR1($i$) upon the first reception and received data DR2($i$) upon a reception of retransmission data in FIG. 21, errors occur at symbol positions hatched diagonally. In this case, the output C2 of code comparing section 128 shows that, in the first and second symbols, the high level is shown and no error occurs, and, in the third to fifth symbols, the low level is shown and errors occur.

The memory length of data holding section 2202-1 in first correlator 2107 is the delay estimating sequence length (i.e. the length obtained by subtracting one from the delay estimating symbol length) and data holding section 2202-1 stores decoded data D20 input from deciding section 2110 in M1(1) first. Data holding section 2202-1 employs a shift register configuration and shifts held data sequentially, for example, from M1(1) to M1(2) and M1(2) to M1(3) (shifts data in ascending order of the numbers in the parentheses "( )") per symbol time.

Data holding section 2202-2 in second correlator 2108 also employs the shift register configuration in the same way. Decoded data D20 is not input directly from deciding section 2110 to data holding section 2202-2 in second correlator 2108. But the difference is that decoded data D20 inverted by NOT element 2112 is input.

Figure 22A:
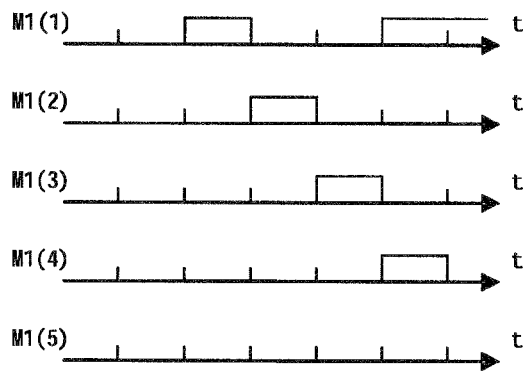
FIG. 22 shows shift register values M1(1) to M1(5)
Figure 22B:
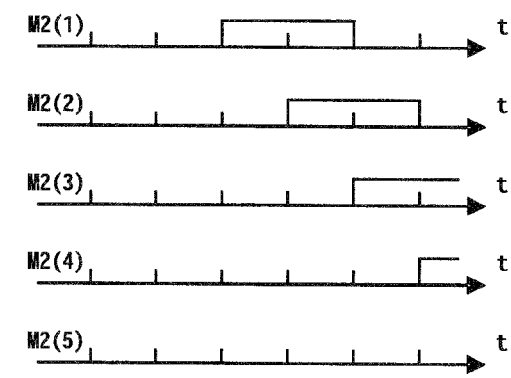

Meanwhile, the values of data holding sections 2201-1 and 2202-2 are all reset to zero at the time a frame is received, so that M1={(M1(1), M1(2), M1(3), M1(4), M1(5)}={0, 0, 0, 0, 0}, and M2={M2(1), M2(2), M2(3), M2(4) M2(5)}={0, 0, 0, 0, 0}. The values in parentheses "( )" represent the order of registers composing the shift register, not the symbol time. In the following description, the shift register values of M1 and M2 are written horizontally as described above, and FIG. 22A and FIG. 22B show shift register values M1(1) to M1(5) and M2(1) to M2(5) in a vertical arrangement.

First correlator 2107 carries out a product-sum operation of the delay estimating sequence X1 of delay estimate holding section 2201-1 and the value M1 of data holding section 2202-1 based on equation 1, and outputs the resulting product-sum result to quantity comparing section 2109.

[1]

$$\sum_{i=1}^{5}\{X1(i) \times M1(i)\} \quad \text{(Equation 1)}$$

Similarly, second correlator 2108 carries out a product-sum operation of the delay estimating sequence X2 of delay estimate holding section 2201-2 and the value M2 of data holding section 2202-2 based on equation 2, and outputs the resulting product-sum result to quantity comparing section 2109.

[2]

$$\sum_{i=1}^{5}\{X2(i) \times M2(i)\} \quad \text{(Equation 2)}$$

Figure 23:
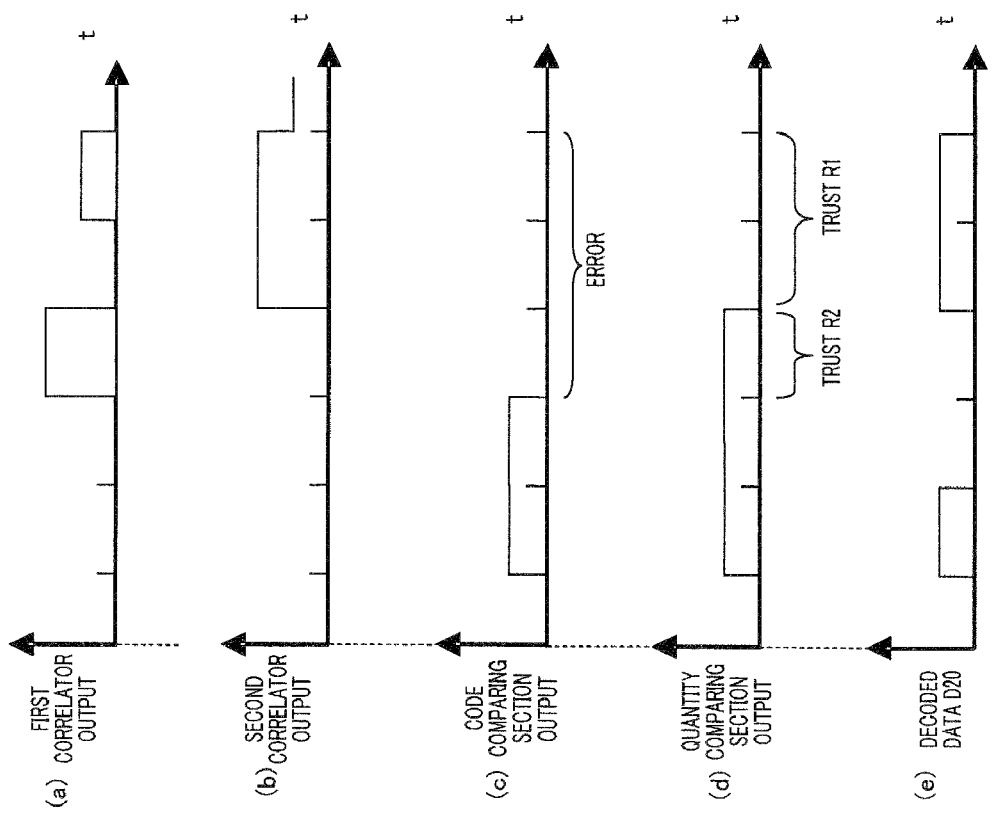
FIG. 23 shows an output result from each section.

FIGS. 23(a) and (b) show conditions of variations of product-sum operation results in the time domain acquired by equation 1 and equation 2. As described above, the delay wave with respect to the on-pulse signal (DT1(1)=1) of the first symbol upon the first transmission arrives in the third symbol. On the other hand, given that the first symbol upon a retransmission is an off-pulse signal (DT2(1)=0), a delay wave does not arrive in the third symbol. Consequently, if received data DR1(3) upon the first reception and DR2(3) upon a reception of retransmission data are decided as on-pulse signals, received data DR1(3)=1 is decided in the third symbol upon the first reception because the delay wave 1 of the on-pulse signal (DT1(1)=1) transmitted in the first symbol arrives. On the other hand, the third symbol upon a reception of retransmission data is not influenced by a delay wave and received data DR2(3)=1 is decided in the third symbol upon a reception of retransmission data due to retransmission data DT2(3)=1 itself in the third symbol.

In this case, the correlation value calculated from equation 1 is greater than a correlation value calculated from equation 2 as shown in FIGS. 23(a) and (b). That is, product-sum operation results obtained from equations 1 and 2 show the magnitude of the influence of delay waves of past on-pulse signals upon the current symbol position. In other words, when product-sum operation results are greater, it is more likely that the current symbol is decided as an on-pulse signal by error due to the influence of delay waves of past on-pulse signals.

In this way, focusing upon that, in the on-off keying modulation scheme, error decision is more likely to occur due to the influence of delay waves of past on-pulse signals, with the present embodiment, deciding section 2110 carries out a data decision based on the correlation value between a delay estimating sequence showing the delay profile and past decoded data and the correlation value between the delay estimating sequence and inverted code data of past decoded data. The data decision steps in deciding section 2110 will be described below using specific examples.

[Data Decision Steps]

(1) Data Decision in the First Symbol

In the first symbol, the value M1 of data holding section 2202-1 of first correlator 2107 and the value M2 of data holding section 2202-2 of second correlator 2108 are all reset to "0." With the present embodiment, given that the delay estimating symbol length is determined such that the difference between times the direct wave and delay waves of a radio channel applied arrive does not exceed the delay estimating symbol length and bits after the second bit of the delay estimating symbol are "0," an error resulting from the influence of the delay wave does not occur in the first symbol. In this case, the output C2 of code comparing section 128 becomes HIGH showing that there is no error, the value of R1 itself, that is, DR1(1)=1, is decided as decoded data D20.

(2) Data Decision in the Second Symbol

The value "1" of decoded data D20 of the first symbol is input to data holding section 2202-1 of first correlator 2107, and M1={0, 0, 0, 0, 0} changes to M1={1, 0, 0, 0, 0} The value "0" that inverts decoded data D20 of the first symbol is input to data holding section 2202-2 of second correlator 2108, and so the value of M2 does not change. Although, generally, an error is likely to occur due to delay waves after the second symbol, the first delay wave 1 arrives with two symbols of delay with the present embodiment, and so an error resulting from the delay waves still does not occur. In this case, given that the output C2 of code comparing section 128 becomes HIGH showing that there is no error, the value of R1 itself, that is, DR1(2)=0, is decided as decoded data D20.

(3) Data Decision in the Third Symbol

The value "0" of decoded data D20 of the second symbol is input to data holding section 2202-1 of first correlator 2107, and M1={1, 0, 0, 0, 0} changes to M1={0, 1, 0, 0, 0}. The value "1" that inverts decoded data D20 of the second symbol is input to data holding section 2202-2 of second correlator 2108, and M2={0, 0, 0, 0, 0} changes to M2={1, 0, 0, 0, 0}.

As shown by diagonal hatching in FIG. 21A, in the third symbol, transmission data DT1(3)=0 changes to received data DR1(3)=1 due to the influence of the delay wave, thereby producing an error. In this case, the output C2 of code comparing section 128 shows LOW, and so data value decision of decoded data D20 is carried out according to the comparison result C1 of quantity comparing section 2109 instead of the value of R1 itself.

In this case, the output level of first correlator 2107 is equal to X1(2) according to equation (1) and the output level of second correlator 2108 is "0" according to equation (2). The output level of second correlator 2108 is smaller than the output level of first correlator 2107, and so the output result C1 of quantity comparing section 2109 is "1." Consequently, assuming that the reliability of the value DR2(3) upon a reception of retransmission data is higher than the value DR1(3) upon the first reception, as shown in the logic table of FIG. 17, deciding section 2110 decides the value "0" that inverts DR2(3)=1, as decoded data D20 of the third symbol.

(4) Data Decision in the Fourth Symbol

The value "0" of decoded data D20 of the third symbol is input to data holding section 2202-1 of first correlator 2107, and M1={0, 1, 0, 0, 0} changes to M1={0, 0, 1, 0, 0}. The value "1" that inverts decoded data D20 of the third symbol is input to data holding section 2202-2 of second correlator 2108, and M2={1, 0, 0, 0, 0} changes to M2={1, 1, 0, 0, 0}.

As shown by diagonal hatching in FIG. 21B, in the fourth symbol, transmission data DT2(4)=0 changes to received data DR2(4)=1 due to the influence of delay waves, thereby producing an error. In this case, the output C2 of code comparing section 128 shows LOW, and so data value decision of decoded data D20 is carried out according to the comparison result C1 of quantity comparing section 2109 instead of the value of R1 itself.

In this case, the output level of first correlator 2107 is equal to 0 according to equation 1, and the output level of second correlator 2108 is X2(2) according to equation 2. The output level of second correlator 2108 is greater than the output level of first correlator 2107, and so the output result C1 of quantity comparing section 2109 is "0." Consequently, assuming that the reliability of the value DR1(4) upon the first reception is higher than the value DR2(4) upon a reception of retransmission data, as shown in the logic table of FIG. 17, DR1(4)=1 is decided as decode data D20.

(5) Data Decision in the Fifth Symbol

The value "1" of decoded data D20 of the fourth symbol is input to data holding section 2202-1 of first correlator 2107, and M1={0, 0, 1, 0, 0} changes to M1={1, 0, 0, 1, 0}. The value "0" that inverts decoded data D20 of the fourth symbol is input to data holding section 2202-2 of second correlator 2108, and M2={1, 1, 0, 0, 0} changes to M2={0, 1, 1, 0, 0}.

As shown by diagonal hatching of R2 data upon a reception of retransmission data in FIG. 21B, in the fifth symbol, transmission data DT2(5)=0 changes to received data DR2(5)=1 due to delay waves, thereby producing an error. In this case, the output C2 of code comparing section 128 shows LOW, and so data value decision of decoded data D20 is carried out according to the output C1 of quantity comparing section 2109 instead of the value of R1 itself.

In this case, the output level of first correlator 2107 is equal to X1(4) according to equation 1, and the output level of second correlator 2108 is X2(2) according to equation 2. The output level of second correlator 2108 is greater than the output level of first correlator 2107, and so the output result C1 of quantity comparing section 2109 shows "0." Consequently, assuming that the reliability of the value DR1(5) upon the first reception is higher than the value DR2(5) upon a retransmission, as shown in the logic table of FIG. 17, deciding section 2110 outputs DR1(5)=1 as decoded data D20.

As described above, according to the present embodiment, focusing upon that, in the on-off keying modulation scheme, error decision is more likely to occur due to the influence of delay waves of past on-pulse signals, if code errors are detected, it is decided which chance the symbol in a position where a code error is detected is an on-pulse signal or off-pulse signal is higher, according to the comparison result of a correlation operation value between past decoded data D20 and the delay profile and a correlation operation value between inverted data of past decoded data D20 and the delay profile. In this way, according to the present embodiment, it is possible to accurately decode a code in a position where a code error is detected, by deciding the influence of delay waves of past on-pulse signals upon decision positions based on the magnitude of the correlation value between the past on-pulse signals and delay profile and excluding detected data decided by error due to delay waves.

Meanwhile, although C2 is output from code comparing section 128 in FIG. 13, whether or not there is an error is decided according to the value of C2, and so deciding section 2110 may operate depending on whether or not an error is detected in error detecting section 2103.

Further, although deciding section 2110 is configured including switches 2502 and 2504, data value determining section 2503 may select one of R1 and inverted data of R2 as decoded data D20 according to the command of data controlling section 2111.

Embodiment 5

With the present embodiment, an example of a method of ARQ (Automatic Repeat reQuest) based on Embodiment 1 to Embodiment 3 will be described in detail.

Figure 24:
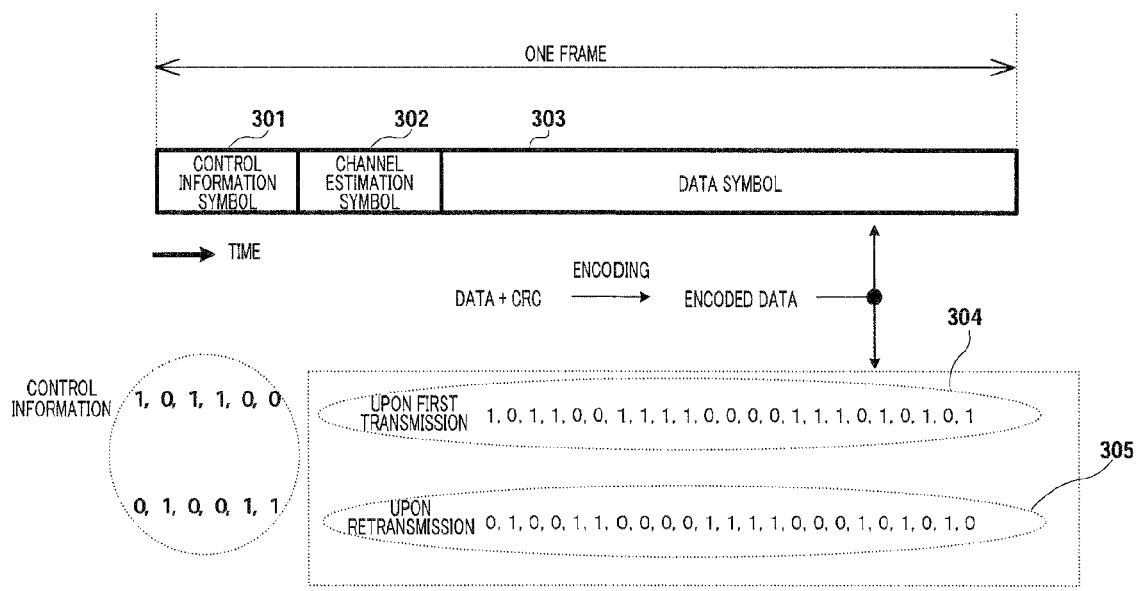
FIG. 24 shows an example of a frame configuration according to Embodiment 5 of the present invention.

FIG. 24 shows an example of a frame configuration of one frame according to the present embodiment. In FIG. 24, one frame is formed with control information symbol 301, channel estimation symbol 302 and data symbol 303. Control information symbol 301 refers to information symbols, other than data, to transmit to establish communication, such as information of the party of the transmission destination (hereinafter corresponding to the second terminal (described later)), the data length, information showing whether or not data is retransmitted data and the retransmission counts. Channel estimation symbol 302 refers to a symbol for the terminal of the communicating party to estimate a radio wave propagation environment that varies due to fading and multipath. As shown in FIG. 24, data symbol 303 refers to an encoded data symbol obtained by carrying out an error correction coding of a sequence formed with data and CRC (Cyclic Redundancy Check) code for detecting errors.

Figure 25:
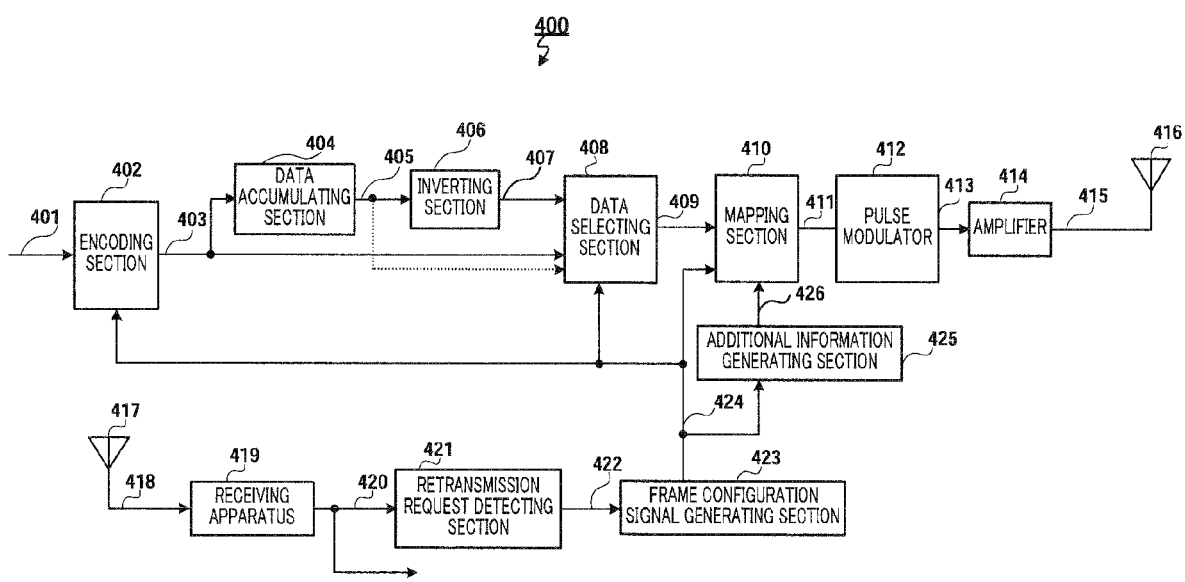
FIG. 25 is a block diagram showing a configuration example of the first terminal according to Embodiment 5.

FIG. 25 is a block diagram showing an example of a configuration of first terminal 400 according to the present embodiment. The transmission signal from the communicating party is received at receiving antenna 417, and receiving apparatus 419 receives as input received signal 418 received at receiving antenna 417, demodulates received signal 418 and outputs received data 420.

Retransmission request detecting section 421 receives as input received data 420, extracts information showing whether or not retransmission is requested by the communicating party and outputs the information as retransmission request information 422.

Frame configuration signal generating section 423 receives as input retransmission request information 422 and outputs information 424 related to a frame configuration including information showing whether or not to carry out a retransmission (hereinafter also referred to as "frame configuration signal").

Additional information generating section 425 receives as input frame configuration signal 424, generates information 426 of an additional information symbol excluding data symbol 303 of FIG. 24 and outputs additional information symbol information 426 to mapping section 410.

Encoding section 402 receives as data including CRC and input frame configuration signal 424, carries out, for example, one of convolution coding, LDPC (Low Density Parity Check) coding and turbo coding, and outputs encoded data 403.

Data accumulating section 404 receives as input encoded data 403, accumulates data, and, if necessary, outputs accumulated data 405.

Inverting section 406 receives as input accumulated data 405, inverts bits such that the bit is inverted to "1" when the input bit is "0" and the bit is inverted to "0" when the input bit is "1," and outputs inverted data 407.

Data selecting section 408 receives as input encoded data 403, accumulated data 405, inverted data 407 and frame configuration signal 424, selects one of encoded data 403, accumulated data 405 and inverted data 407 according to frame configuration signal 424 and outputs the result as selected data 409. Meanwhile, the operation of data selecting section 408 will be described in detail below.

Mapping section 410 receives as input selected data 409, additional information symbol information 426 and frame configuration signal 424 and outputs signal 411 after mapping, according to the frame configuration of FIG. 24.

Pulse modulator 412 receives as input signal 411 after mapping and outputs pulse modulation signal 413. Amplifier 414 receives as input pulse modulation signal 413, amplifies pulse modulation signal 413 and outputs amplified pulse modulation signal 415. Amplified modulated signal 415 is output as a radio wave from transmitting antenna 416.

Figure 26:
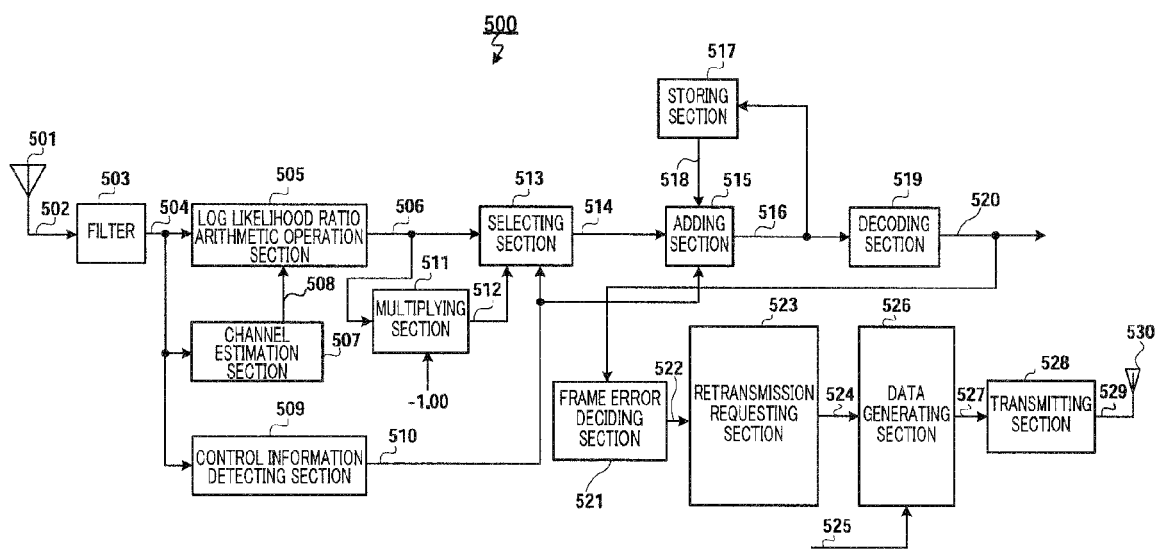
FIG. 26 is a block diagram showing a configuration example of the second terminal according to Embodiment 5.

FIG. 26 is a block diagram showing an example of a configuration of second terminal 500, which is a communicating party of first terminal 400 of FIG. 25. Filter 503 receives as input received signal 502 received at receiving antenna 501, carries out band limitation and outputs received signal 504 after the band limitation to log likelihood ratio arithmetic operation section 505, channel estimation section 507 and control information detecting section 509.

Channel estimating section 507 receives as input received signal after the band limitation, extracts channel estimation symbol 302 of FIG. 24, carries out channel estimation and outputs resulting channel estimation signal 508 to log likelihood ratio arithmetic operation section 505.

Control information detecting section 509 receives as input received signal 504 after the band limitation, extracts control information symbol 301 of FIG. 24, carries out detection (in case where encoding has been carried out, also carries out decoding) and outputs information showing whether or not this transmission is retransmission or information showing the retransmission count, as control information 510 to selecting section 513.

Log likelihood ratio arithmetic operation section 505 receives as input received signal 504 after the band limitation and channel estimation signal 508, calculates a log likelihood ratio (LLR) (see Non-Patent Document 1 and Non-Patent Document 2) and outputs resulting log likelihood ratio 506 to multiplying section 511 and selecting section 513. Log likelihood ratio 506 will be described later using FIG. 29.

Multiplying section 511 receives as input log likelihood ratio 506, multiplies log likelihood ratio 506 by (−1) and outputs the value after multiplication to selecting section 513 as log likelihood ratio 512.

Selecting section 513 receives as input log likelihood ratios 506 and 512 and control information 510, selects one of log likelihood ratios 506 and 512 based on information showing whether or not this transmission is retransmission and information showing the retransmission counts included in control information 510. The selection operation will be described below using FIG. 28 and FIG. 29.

Adding section 515 receives as input selected log likelihood ratio 514, stored log likelihood ratio 518 and control information 510, and, based on information included in control information 510 showing whether or not this transmission is a retransmission, outputs selected log likelihood ratio 514 to decoding section 519 as log likelihood ratio 516 when control information 510 shows that this transmission is not a retransmission. On the other hand, when control information 510 shows that this transmission is a retransmission, adding section 515 adds selected log likelihood ratio 514 and stored log likelihood ratio 518 and outputs the log likelihood ratio after addition, to decoding section 519 as log likelihood ratio 516.

Decoding section 519 receives as input log likelihood ratio 516, decodes log likelihood ratio 516 and acquires received data 520.

Frame error deciding section 521 receives as input received data 520, carries out a CRC check, decides whether or not there are errors in data (see FIG. 24) of one frame transmitted and outputs the decision result to retransmission requesting section 523 as frame error presence information 522.

Retransmission requesting section 523 receives as input frame error presence information 522, decides whether or not to request a retransmission to the communicating party (first terminal 400) and outputs the decision result to data generating section 526 as retransmission request information 524.

Data generating section 526 receives as input retransmission request information 524 and data 525, generates transmission data 527 and outputs transmission data to transmitting apparatus 528.

Transmitting apparatus 528 receives as input transmission data 527, generates modulated signal 529 according to the frame configuration (described later) shown in FIG. 27 and outputs modulated signal 529 through antenna 530 as a radio wave.

Figure 27:
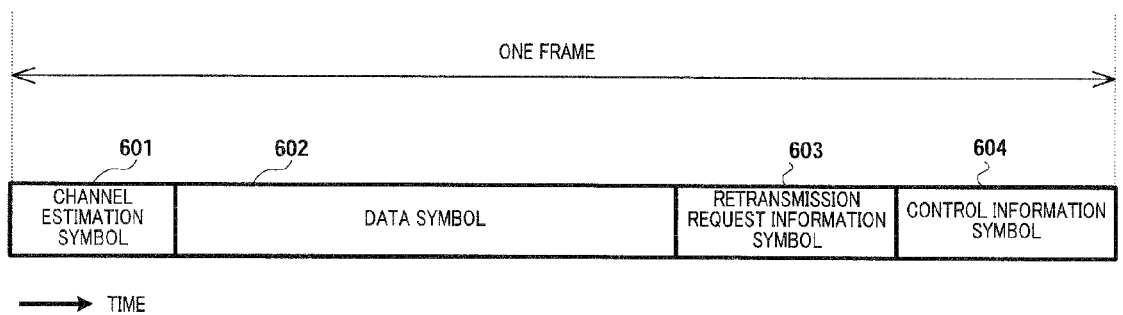
FIG. 27 shows an example of a configuration of one frame of a modulated signal transmitted by the second terminal.

FIG. 27 shows an example of a configuration of one frame of a modulated signal transmitted from second terminal 500 of FIG. 26. In FIG. 27, one frame is formed with channel estimation symbol 601, data symbol 602, retransmission request information symbol 603 and control information symbol 604. Channel estimation symbol 601 refers to a symbol for the communicating party to estimate variation of a propagation environment and is, for example, a signal known by the communicating party. Data symbol 602 refers to a symbol for transmitting information data and retransmission request information symbol 603 refers to a symbol for reporting to the communicating party whether or not there is a retransmission request. Control information symbol 604 refers to information symbols, other than data, to transmit to establish communication, such as information of the party of the transmission destination, the data length, information showing whether or not data is retransmitted data and the retransmission count.

Figure 28:
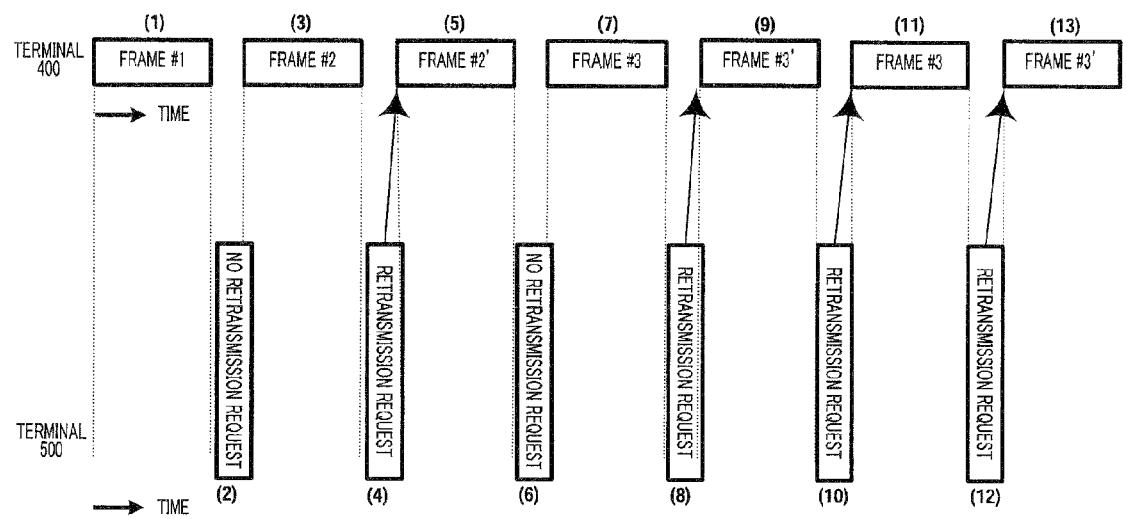
FIG. 28 shows an example of the data flow between the first terminal and the second terminal.

Referring to FIG. 28, the operations of first terminal 400 and second terminal 500 configured as described above will be described below. FIG. 28 shows an example of a data flow between first terminal 400 and second terminal 500.

FIG. 28(1): First, first terminal 400 transmits a modulated signal of frame #1 according to the frame configuration of FIG. 24. In this case, transmission data is not retransmission data, and so data selecting section 408 selects encoded data 403 as selected data 409.

FIG. 28(2): Second terminal 500 receives and demodulates the signal of frame #1 and carries out a CRC check of the signal of frame #1. An error does not occur as a result of a CRC check, and so second terminal 500 does not request a retransmission to first terminal 400.

FIG. 28(3): First terminal 400 transmits a modulated signal of frame #2. Instead of retransmission data, data sequence 304 of FIG. 24 is transmitted as transmission data.

FIG. 28(4): Second terminal 500 receives and demodulates the signal of frame #2 and carries out a CRC check of the signal of frame #2. An error occurs as a result of a CRC check, and so second terminal 500 requests a retransmission to first terminal 400.

FIG. 28(5): Having received a retransmission request from second terminal 500, first terminal 400 transmits frame #2' corresponding to data transmitted in frame #2. The significance of frame #2' will be described here. FIG. 28(3) shows that data sequence 304 of FIG. 24 is transmitted. Data sequence 305, which is bit inverted data of data sequence 304, is transmitted as frame #2'. That is, data selecting section 408 selects inverted data 407 as selected data 409. Data sequence 305 of FIG. 24 is generated as inverted data 407 in inverting section 406 of FIG. 25.

FIG. 28(6): Second terminal 500 receives and demodulates the signal of frame #2' and carries out a CRC check of the signal of frame #2'. An error does not occur as a result of a CRC check, and so second terminal 500 does not request a retransmission to first terminal 400.

FIG. 28(7): First terminal 400 transmits a modulated signal of frame #3. Instead of retransmission data, data sequence 304 of FIG. 24 is transmitted as transmission data.

FIG. 28(8) Second terminal 500 receives and demodulates the signal of frame #3 and carries out a CRC check of the signal of frame #3. An error occurs as a result of a CRC check, and so second terminal 500 requests a retransmission to first terminal 400.

FIG. 28(9): Having received a retransmission request from second terminal 500, first terminal 400 transmits frame #3' corresponding to data transmitted in frame #3. The significance of frame #3' will be described here. FIG. 28(7) shows that data sequence 304 of FIG. 24 is transmitted. Then, data sequence 305 of FIG. 24, which is bit inverted data of data sequence 304, is transmitted as frame #3'. That is, data selecting section 408 selects inverted data 407 as selected data 409. Data sequence 305 of FIG. 24 is generated as inverted data 407 in inverting section 406 of FIG. 25.

FIG. 28(10): Second terminal 500 receives and demodulates the signal of frame #3' and carries out a CRC check of the signal of frame #3'. An error occurs as a result of a CRC check, and so second terminal 500 requests a retransmission to first terminal 400.

FIG. 28(11): Having received a retransmission request from second terminal 500, first terminal 400 transmits frame #3 corresponding to data transmitted in frame #3. That is, first terminal 400 transmits the same frame configuration as in FIG. 28(7). Consequently, data selecting section 408 selects encoded data 403 as selected data 409.

FIG. 28(12): Second terminal 500 receives and demodulates the signal of frame #3 and carries out a CRC check of the signal of frame #3. An error occurs as a result of a CRC check, and so second terminal 500 requests a retransmission to first terminal 400.

FIG. 28(13): Having received a retransmission request from second terminal 500, first terminal 400 transmits frame #3' corresponding to data transmitted in the frame #3. That is, first terminal 400 transmits the same frame configuration as in FIG. 28(9). Consequently, data selecting section 408 selects inverted data 407 as selected data 409.

What is significant here is that inverted data is transmitted upon the first retransmission. By so doing, with the present embodiment, by transmitting inverted date upon the first retransmission, the log likelihood ratio of original data and the log likelihood ratio of code inverted data of the original data can be acquired at the receiving end, so that a soft decision is carried out using these log likelihood ratios. As a result, the influence of intersymbol interference due to delay waves can be reduced, so that it is possible to produce an advantage of improving received quality. Meanwhile, although an example has been described with the above description where inverted data and transmission data upon the first transmission are alternately retransmitted after the second retransmission, the present invention is not limited to this. However, it is more suitable to carry out transmission alternately to improve received quality more efficiently while reducing the influence of delay waves.

The advantage of improving received quality when a soft decision is used will be added below using FIG. 29.

FIG. 29 shows images of the received condition where the horizontal axis and the vertical axis are used for time and for amplitude, respectively. FIG. 29A shows the received signal waveform upon the first transmission. The first transmission refers to a case where data that is not retransmitted as in FIG. 28(7), is transmitted. FIG. 29A shows an example of a case where the data sequence upon the first transmission shows "0" at time (i−1), "1" at time i, "1" at time (i+1) and "0" at time (i+2).

In FIG. 29, "Amp" represents the value of estimated amplitude level 701 of "1." The value of this Amp is estimated in receiving apparatus 419 based on channel estimation symbol 302 of FIG. 24. Further, in the same figure, "0" represents a value of estimated amplitude level 702 of "0."

Further, in the same figure, signal 703_a represents a received signal waveform. Euclidean distance 704_a represents the Euclidean distance between a received value and estimated amplitude level 702 of "0." The Euclidean distance between the received value at time t and estimated amplitude level 702 of "0" is represented by $E_0(t)$. Further, Euclidean distance 705_a represents the Euclidean distance between a received value and estimated amplitude level 701 of "1." The Euclidean distance between the received value at time t and estimated amplitude level 701 of "1" is represented by $E_1(t)$.

In this case, the log likelihood ratio $LLR_f(t)$ at time t is represented as in equation 3.

[3]

$$LLR_f(t) = \frac{E_1^2(t) - E_0^2(t)}{2\sigma^2} \quad \text{(Equation 3)}$$

$\sigma^2$ is the variance of noise and is a known value in receiving apparatus 419.

FIG. 29B shows as an example the received signal waveform upon the first retransmission as in FIG. 28(9). Inverted data is transmitted upon the first retransmission, and, consequently, FIG. 29B shows an example where the data sequence upon a retransmission shows "1" at time (i−1), "0" at time i, "0" at time (i+1) and "1" at time (i+2).

In FIG. 29B, signal 703_b shows a received signal waveform. Euclidean distance 704_b represents the Euclidean distance between a received value and estimated amplitude level 702 of "0." The Euclidean distance between a received value at time t and estimated amplitude level 702 of "0" is represented by $E_{ARQ,0}(t)$. Further, Euclidean distance 705_b represents the Euclidean distance between a received value and estimated amplitude level 701 of "1." The Euclidean distance between a received value at time t and estimated amplitude level 701 of "1" is represented by $E_{ARQ,1}(t)$.

In this case, the log likelihood ratio $LLR_{ARQ,1}(t)$ at time t is represented as in equation 4.

[4]

$$LLR_{ARQ,1}(t) = \frac{E_{ARQ,1}^2(t) - E_{ARQ,0}^2(t)}{2\sigma^2} \quad \text{(Equation 4)}$$

$\sigma^2$ is the variance of noise and is a known value in receiving apparatus 419.

Equation 5 is determined utilizing the LLR of equation 3 obtained upon the first reception and the LLR of equation 4 obtained upon the first reception of retransmission data.

[5]

$$LLR_1 = LLR_f - LLR_{ARQ,1} \quad \text{(Equation 5)}$$

In equation 5, instead of adding (+) the $LLR_{ARQ,1}(t)$ to the $LLR_f(t)$, the $LLR_{ARQ,1}(t)$ is subtracted (−) from the $LLR_f(t)$, because inverted bits for transmission data upon the first transmission are transmitted upon the first retransmission. That is, what is significant in using equation 5 is that the $LLR_f(t)$ and the $LLR_{ARQ,1}(t)$ are log likelihood ratios showing the relationship of inversion. The phrase "log likelihood ratios showing the relationship of inversion" means that, in a case where the log likelihood ratio in data #A is the $LLR_f(t)$, the $LLR_{ARQ,1}(t)$ is the log likelihood ratio determined when inverted data of data #A is received. In this way, adding section 515 calculates log likelihood ratio 516 used in decoding section 519, using equation 5.

As described above, with the present embodiment, if "0" is transmitted upon the first transmission, "1" is transmitted as inverted data upon a retransmission, and so it is anticipated that the log likelihood ratio showing that data is close to "1" upon a reception of retransmission data, certainly increases. In this way, in a case where, even though "0" is transmitted upon the first transmission, the log likelihood ratio shows that data is close to "1," due to the influence of delay waves, by subtracting the log likelihood ratio (equation 4) showing that data is close to "1" from the log likelihood ratio (equation 3) that is highly likely to be decided by error due to the influence of delay waves, the log likelihood ratio (equation 5) after subtraction is less likely to show that data is close to "1." In this way, compared to the case where decoding is carried out using the log likelihood ratio (equation 3) as is in the first reception, it is possible to avoid a situation in which the log likelihood ratio is decided as "1" by error due to the influence of delay waves by using the log likelihood ratio (equation 5) taking into account the log likelihood ratio in a reception of retransmission data.

Further, by so doing, "1" is reliably transmitted upon the first transmission or upon a retransmission, so that it is possible to acquire reliable log likelihood ratio at all times t, and, consequently, reduce the influence of delay waves in a reliable manner, mitigate the influence of intersymbol interference and improve received quality.

The above operations will be described in association with the data flow of FIG. 26 and FIG. 28.

1. Case Upon the First Reception (FIG. 28(1), (3), (7))

Upon the first reception, selecting section 513 selects log likelihood ratio 506 as log likelihood ratio 514 and outputs selected log likelihood 514 to adding section 515. Adding section 515 does not carry out an addition operation and outputs log likelihood ratio 514 to decoding section 519 as log likelihood ratio 516. Storing section 517 receives as input this log likelihood ratio 516 and stores log likelihood ratio 516.

2. Case Upon the First Reception of Retransmission Data (FIG. 28(5), (9))

Upon the first reception of retransmission data, selecting section 513 selects log likelihood ratio 512 after multiplication as log likelihood ratio 514 and outputs selected log likelihood ratio 514 to adding section 515. Adding section 515 subtracts log likelihood ratio 514 from log likelihood ratio 516 stored in storing section 517 and outputs the result to decoding section 519 as log likelihood ratio 516. That is, adding section 515 calculates the log likelihood ratio based on equation 5.

3. Case after the Second Reception of Retransmission Data (FIG. 28(11), (13))

Upon the second retransmission as in FIG. 28(11), the log likelihood ratio $LLR_2$ input to decoding section 519 is represented as in equation 6.

[6]

$$LLR_2 = LLR_f - LLR_{ARQ,1} + LLR_{ARQ,2} \quad \text{(Equation 6)}$$

The $LLR_{ARQ,2}$ is the log likelihood ratio determined upon the second retransmission.

Similarly, upon the third retransmission as in FIG. 28(13), the log likelihood $LLR_3$ input to decoding section 519 is represented as in equation 7.

[7]

$$LLR_3 = LLR_f - LLR_{ARQ,1} + LLR_{ARQ,2} + LLR_{ARQ,3} \quad \text{(Equation 7)}$$

The $LLR_{ARQ,2}$ is the log likelihood ratio determined upon the third retransmission.

As described above, the ARQ scheme employing inverted bit transmission has been described in particular with the present embodiment. First terminal 400 generates the first pulse signal sequence subjected to on-off keying modulation and generates a second pulse signal sequence that inverts the code of the first pulse signal sequence upon an automatic repeat request and transmits the first and second pulse signal sequences, and second terminal 500 receives the first pulse signal sequence subjected to on-off keying modulation and the receives second pulse signal sequence that inverts the code of the first pulse signal sequence, calculates the log likelihood ratios of the received first and second pulse signal sequences, and, when the second pulse signal sequence is received, decodes the first and second pulse signal sequences based on the first and second log likelihood ratios. By this means, even in a situation where decoding is carried out employing only the log likelihood ratio of the first pulse signal sequence and an off-pulse signal is decided as an on-pulse signal by error due to the influence of delay waves, it is possible to reduce the influence of delay waves in a reliable manner, mitigate the influence of intersymbol interference and improve received quality, by carrying out decoding taking into account the log likelihood ratio of the second pulse signal sequence which is inverted data of the first pulse signal sequence.

Meanwhile, although a retransmission method of stop-and-wait scheme has been described with the present embodiment as an example, the present invention is not limited to this and can be implemented in the same way according to a transmission scheme of selectively retransmitting only a frame that is not delivered to the communicating party due to transmission error, that is, in a selective retransmission scheme. The details of the selective retransmission scheme are disclosed in Non-Patent Document 3. What is significant with the present embodiment is that, upon a retransmission, the bit inverted data sequence of the data sequence in the first transmission is transmitted.

Embodiment 6

With the present embodiment, a scheme combining Embodiment 5 and hybrid ARQ will be described in detail. The hybrid ARQ scheme is disclosed in Non-Patent Document 4.

The basic data sequence subjected to error correction coding is an original sequence, and redundant data (i.e. puncture data) generated upon error correction coding is a parity sequence. According to the hybrid ARQ scheme, the original sequence is transmitted first, and, if there is a retransmission request from the communicating party, a sequence including the parity sequence is transmitted as retransmission data. For example, Non-Patent Document 5 discloses in detail a method of generating puncture data (i.e. redundant data) of an error correction code. Further, according to the hybrid ARQ scheme, demodulation is carried out to acquire the original sequence using a sequence including the parity sequence that is retransmitted, and demodulation is carried out based on the original sequence demodulated upon this reception of retransmission data and the original sequence demodulated upon the first transmission to acquire the final original sequence.

Configurations of first terminal 400 and second terminal 500 according to the present embodiment are the same as in FIG. 25 and FIG. 26, and so repetition of description will be omitted.

Figure 30:
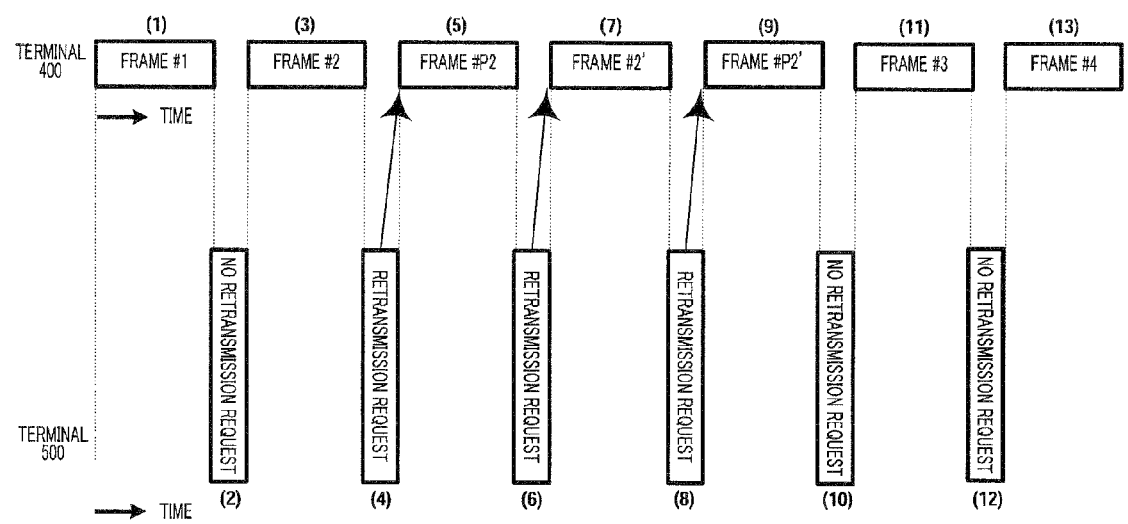
FIG. 30 shows an example of the data flow between the first terminal and the second terminal according to Embodiment 6.

Referring to FIG. 30, operations of first terminal 400 and second terminal 500 according to the present embodiment will be described. FIG. 30 shows an example of the data flow between first terminal 400 and second terminal 500 according to the present embodiment.

FIG. 30(1): First, first terminal 400 transmits a modulated signal of frame #1 according to the frame configuration of FIG. 24. In this case, given that the transmission data is not retransmission data, encoded data 403 is selected in data selecting section 408 as selected data 409. Meanwhile, the transmission data is the above-described original sequence.

FIG. 30(2): In second terminal 500, a signal of frame #1 is received, demodulation is carried out to acquire the original sequence and a CRC check is carried out. An error does not occur as a result of a CRC check, and so second terminal 500 does not request a retransmission to first terminal 400.

FIG. 30(3): First terminal 400 transmits a modulated signal of frame #2. Transmission data is not retransmission data and is the above-described original sequence. That is, data sequence 304 of FIG. 24 is transmitted in this case.

FIG. 30(4): Second terminal 500 receives and demodulates the signal of frame #2 and carries out a CRC check of the signal of frame #2. An error occurs as a result of a CRC check, and so second terminal 500 requests a retransmission to first terminal 400.

FIG. 30(5): Having received a retransmission request from second terminal 500, first terminal 400 transmits frame #2P including puncture data (i.e. redundant data) generated when data transmitted in frame #2 is encoded.

FIG. 30(6): In second terminal 500, the signal of frame #2P is received, demodulation is carried out to acquire the original sequence using the log likelihood ratio of the original sequence obtained by receiving frame #2 and the log likelihood ratio of the original sequence obtained by receiving frame #2P and a CRC check is carried out. An error occurs as a result of a CRC check, and so second terminal 500 request a retransmission to first terminal 400.

FIG. 30(7): Having received a retransmission request from second terminal 500, first terminal 400 transmits frame #2' corresponding to data transmitted in frame #2. The significance of frame #2' will be described here. In FIG. 30(4), data sequence 304 of FIG. 24 is transmitted. Then, data sequence 305 of FIG. 24, which is bit inverted data of data sequence 304, is transmitted as frame #2'. That is, data selecting section 408 selects inverted data 407 as selected data 409. Data sequence 305 of FIG. 24 is generated in inverting section 406 of FIG. 25. Further, storing section 404 stores both of the original sequence and puncture data (i.e. redundant data) and, if necessary, outputs one of the original sequence and puncture data (i.e. redundant data).

FIG. 30(8): In second terminal 500, demodulation is carried out to acquire the original sequence using the log likelihood ratio of the original sequence obtained by receiving frame #2, the log likelihood ratio of the original sequence obtained by receiving frame #2P and the log likelihood ratio of the code inverted sequence of the original sequence obtained by receiving frame #2', and a CRC check is carried out. An error occurs as a result of a CRC check, and so second terminal 500 requests a retransmission to first terminal 400.

FIG. 30(9): Having received a retransmission request from second terminal 500, first terminal 400 transmits frame #2P" corresponding to data transmitted in frame #2P. The significance of frame #2P" will be described here. In FIG. 30(5), frame #2P is transmitted. Then, bit inverted data of frame #2P is transmitted as frame #2P". That is, data selecting section 408 selects inverted data 407 as selected data 409.

FIG. 30 (10): In second terminal 500, demodulation is carried out to acquire the original sequence using the log likelihood ratio of the original sequence obtained by receiving frame #2, the log likelihood ratio of the original sequence obtained by receiving frame #2P, the log likelihood ratio of the inverted code sequence of the original sequence obtained by receiving frame #2' and the log likelihood ratio of the inverted code sequence of the original sequence obtained by receiving frame #2P", and a CRC check is carried out. An error does not occur as a result of a CRC check, and so second terminal 500 does not request a retransmission to first terminal 400.

FIG. 30(11): First terminal 400 transmits a modulated signal of frame #3. Meanwhile, the transmission data is not retransmission data but is the original sequence.

FIG. 30(12): In second terminal 500, a signal of frame #3 is received, demodulation is carried out to acquire the original sequence and a CRC check is carried out. An error does not occur as a result of a CRC check, and so second terminal 500 does not request a retransmission to first terminal 400.

FIG. 30(13): First terminal 400 transmits a modulated signal of frame #4. The transmission data is not retransmission data but is the original sequence.

As described above, Embodiment 4 is integrated with hybrid ARQ with the present embodiment, so that first terminal 400, upon a retransmission, transmits parity data (i.e. redundant data), transmits bit inverted data of data (i.e. original sequence) and transmits bit inverted data of parity data (i.e. redundant data), and second terminal 500 combines log likelihood ratios acquired from the original sequence, inverted data of the original sequence, parity sequence or inverted data of the parity sequence, calculates a first log likelihood ratio before code inversion and a second log likelihood ratio after code inversion and carries out decoding to acquire the original sequence based on these log likelihood ratios before and after code inversion. In this way, instead of simply retransmitting the original sequence or parity sequence, by transmitting the original sequence and parity sequence after code inversion and carrying out decoding to acquire the original sequence based on log likelihood ratios acquired before and after code inversion, multipath robustness increases, so that it is possible to reduce the influence of delay waves, mitigate the influence of intersymbol interference, improve received quality and, consequently, transmit data to the communicating party adequately.

Examples of combining log likelihood ratios include calculating the log likelihood ratio of the original sequence using the parity sequence, correcting the log likelihood ratio of the original sequence received as the first pulse signal sequence using the log likelihood ratio and calculating the first log likelihood ratio before code inversion, and include calculating the log likelihood ratio of the original sequence first, using the parity sequence received as the first pulse signal sequence and the code inverted sequence of the parity sequence received as a second pulse signal sequence, correcting the log likelihood ratio of the original sequence received as the first pulse signal sequence using the log likelihood ratio and calculating the first log likelihood ratio before code inversion.

In this way, by adding or subtracting the log likelihood ratio of the original sequence obtained upon the first reception, the log likelihood ratio of the code inverted sequence of the original sequence obtained upon a reception of retransmission data, the log likelihood ratio of the parity sequence and the log likelihood ratio of the code inverted sequence of the parity sequence, it is possible to reduce the influence of delay waves in a reliable manner, mitigate the influence of intersymbol interference and improve received quality.

Meanwhile, although a case has been described as an example where parity data (i.e. redundant data) is transmitted upon the first retransmission, bit inverted data of data (i.e.

original sequence) is transmitted upon the second retransmission and bit inverted data of parity data (i.e. redundant data) is transmitted upon the third retransmission, the order is not limited to the order show in FIG. 30.

Embodiment 7

With the present embodiment, a soft decision method using a Manchester code, to be more specific, a method of calculating log likelihood ratios will, be described in detail.

As in Embodiment 3, transmission data is encoded by the Manchester code with the present embodiment. For example, if transmission data is "0," a code of "10" is allocated, and, if transmission data is "1," a code of "01" is allocated.

Meanwhile, the configurations of first terminal 400 and second terminal 500 according to the present embodiment are the same as in FIG. 25 and FIG. 26, and so repetition of description will be omitted. With the present embodiment, encoding section 402 of first terminal 400 carries out encoding using a Manchester code.

FIG. 31 shows images of the received condition where the horizontal axis and the vertical axis are used for time and for amplitude, respectively, in a case where a Manchester code according to the present embodiment is used. FIG. 31A shows a received signal waveform when the transmission sequence is "0," and FIG. 31B shows the received signal waveform when the transmission sequence is "1." Meanwhile, a case will be described as an example where transmission is carried out using a Manchester code and allocating "10" to the transmission sequence when the transmission sequence is "0," and allocating "01" to the transmission sequence when the transmission sequence is "1."

In FIG. 31A and FIG. 31B, signal 801 is a received waveform. Amplitude 802 is an estimated amplitude, and the estimated amplitude value of amplitude 802 can be estimated by detecting channel estimation symbol 302 of FIG. 24 in the receiving apparatus. The estimated amplitude value of amplitude 802 is Amp. Amplitude 803 is the estimated amplitude and the value of amplitude 803 is zero.

In FIG. 31A and FIG. 31B, 803_*a* and 803_*b* show the Euclidean distance between the received value of the first half of a time slot and the estimated amplitude level when the transmission data is "0," and the value is represented by $E_{0x}$. Further, 804_*a* and 804_*b* show the Euclidean distance between the received value of the first half of a time slot and the estimated amplitude level when the transmission data is "1," and the value is represented by $E_{1x}$. Similarly, 805_*a* and 805_*b* show the Euclidean distance between the received value of the second half of a time slot and the estimated amplitude level when transmission data is "0," and the value is represented by $E_{0y}$. Further, 806_*a* and 806_*b* show the Euclidean distance between the received value of the second half of a time slot and the estimated amplitude level when transmission data is "1," and the value is represented by $E_{1y}$.

With the present embodiment, a decoding result is acquired by a soft decision using the log likelihood ratio LLR of equation 8.

[8]

$$LLR = \frac{(E_{1x}^2 + E_{1y}^2) - (E_{0x}^2 + E_{0y}^2)}{2\sigma^2} \quad \text{(Equation 8)}$$

$\sigma^2$ is the variance of noise and is a value known in receiving apparatus 419.

If the sum of the first term and second term ($E_{1x}^2 + E_{1y}^2$) in the numerator is greater and the sum of the third term and the fourth term ($E_{0x}^2 + E_{0y}^2$) in the numerator is smaller in equation 8, it is highly likely that an on-pulse signal is allocated to the first half of the time slot of one bit and an off-pulse signal is allocated to the second half. On the contrary, if the sum of the first term and second term ($E_{1x}^2 + E_{1y}^2$) in the numerator is smaller and the sum of the third term and the fourth term ($E_{0x}^2 + E_{0y}^2$) in the numerator is greater in equation 8, it is highly likely that an off-pulse signal is allocated to the first half of the time slot of one bit and an on-pulse signal is allocated to the second half. Consequently, by calculating the log likelihood ratio LLR according to equation 8 using log likelihood ratios of the first half and second half of a time slot and decoding transmission data before Manchester coding using the resulting log likelihood ratio, it is possible to acquire a reliable decoding result compared to the case where one of log likelihood ratios of the first half and second half of the time slots is decoded.

In this way, with the present embodiment, characteristics that, in a case where a Manchester coding is used, a pair of an on-pulse signal and off-pulse signal are transmitted in the time slot of one bit without transmitting inverted data of transmission data transmitted upon the first transmission, are utilized. That is, with the present embodiment, as shown in equation 8, the reference level is switched ("0" or "Amp") between the first half and second half of a code, a first log likelihood ratio showing data is close to an on-pulse signal and a second log likelihood ratio showing data is close to an on-pulse signal are calculated using the Euclidean distance between a received on-off keying modulation signal sequence and the reference level and the code is decoded based on the resulting first and second log likelihood ratios.

In a case where, due to the influence of multipath, a delay wave arrives in the first half or second half which is fundamentally an off-pulse signal, the level of the delay wave is smaller than the level of the direct wave due to the influence of obstacles, so that it is possible to reduce the influence of delay waves and carry out decoding by using the log likelihood ratio LLR of equation 8. In this way, with the present embodiment, the influence of delay waves can be reduced without requiring a retransmission, so that it is possible to reduce the influence of delay waves, suppress the decrease of throughput and acquire a reliable decoding result.

Particularly, maintaining received quality of control information equal to or better than data is important to establish communication. Consequently, transmission may be performed by carrying out Manchester coding of control information alone.

Meanwhile, even in a case where Manchester coding is used, it is possible to invert allocation of on/off-pulse signals in a time slot of one bit between the first transmission and a retransmission and use the above ARQ method according to Embodiments 5 and 6. In this case, it is possible to reduce the influence of delay waves in a more reliable manner.

Meanwhile, although a case has been described with the above embodiments where error detection of a pulse used in radio communication between the first terminal and second terminal is carried out, the present invention may be applied for error detection of a pulse used in, for example, the field of optical communication.

One aspect of the code error detecting apparatus according to the present invention employs a configuration including: a receiving terminal that receives a first pulse signal sequence subjected to on-off keying modulation and a second pulse signal sequence inverting a code of the first pulse signal sequence; a pulse detecting means that outputs first and second detected data based on the first pulse signal sequence and the second pulse signal sequence received at the receiving terminal; a code comparing means that compares codes of the first and second detected data output from the pulse detecting means; and an error detecting means that detects errors of the codes based on comparison results in the code comparing means.

According to this configuration, it is possible to detect code errors.

One aspect of the code error detecting apparatus according to the present invention employs a configuration in which: the code comparing means compares the codes of the detected data based on an exclusive disjunction; and the error detecting means decides that the codes are errors when the exclusive disjunction in the code comparing means is zero.

According to this configuration, it is possible to detect more code errors by comparatively easy processing.

One aspect of the code error detecting apparatus according to the present invention employs a configuration in which: the comparator carries out the comparison per threshold, every threshold having a unique value, and outputs the detected data per threshold; the code comparing means compares the codes of the detected data per threshold; and the error detecting means detects errors of the codes per threshold from comparison results per threshold.

According to this configuration, code errors can be detected based on code comparison results per threshold value having a unique value, so that it is possible to avoid situations at more ease where an off-pulse signal is decided as an on-pulse signal by error because the threshold is too low or an on-pulse signal is decided as an off-pulse signal by error because the threshold is too high. By this means, it is possible to suppress deterioration of accuracy of code error detection.

One aspect of the code error detecting apparatus according to the present invention employs a configuration further including a threshold controlling means that carries out control to vary the thresholds until detection results in the error detecting means satisfy a predetermined condition.

According to this configuration, even when received power varies, the threshold used to acquire detected data can be set to an optimal value by a hard decision, so that it is possible to suppress deterioration of accuracy of code error detection.

One aspect of the code error detecting apparatus according to the present invention employs a configuration further including: a delay profile acquiring means that acquires a delay profile of a delay estimating symbol received at the receiving terminal; a correlation means that carries out a correlation operation of the delay profile and a code of past decoded data to acquire a first correlation value and carries out a correlation operation of the delay profile and a inverted code of the past decoded data to acquire a second correlation value; and a deciding means that, when a code error is detected in the error detecting means, determines a code of decoded data in which the code error is detected, according to a comparison result of the first and second correlation values.

According to this configuration, by comparing correlation values between the delay profile and past on-pulse signals, when the first pulse signal sequence and the second pulse signal sequence are detected as on-pulse signals and code errors are detected, whether or not on-pulse signals are detected due to delay waves of past on-pulse signals can be identified, so that it is possible to decode the codes at positions where code errors are detected, by excluding detected data detected by error due to delay waves.

One aspect of the code error detecting apparatus according to the present invention employs a configuration in which, when the code error is detected, the deciding means uses the code of the first detected data as the code of the decoded data when the first correlation value is smaller than the second correlation value and uses the inverted code of the second detected data as the code of the decoded data when the first correlation value is greater than the second correlation value.

According to this configuration, it is possible to accurately decode the codes at positions where code errors are detected, by excluding detected data detected by error due to delay waves.

One aspect of the code error detecting apparatus according to the present invention employs a configuration further including: a receiving terminal that receives a pulse signal sequence which is subjected to on-off keying modulation and which is encoded by a Manchester code such that a polarity inverts at a center of a code; a pulse detecting means that outputs detected data inverting the polarity at the center of the code by the Manchester code, based on the pulse signal sequence received at the receiving terminal; a delaying means that delays the detected data output to the pulse detecting means by a predetermined period; a polarity comparator that compares polarities of the detected data output to the pulse detecting means and the detected data delayed in the delaying means; and an error detecting means that detects errors of codes from comparison results in the polarity comparator.

According to this configuration, based on an on-pulse signal and off-pulse signal that invert the polarity in a time slot of one bit by a Manchester code, it is possible to suppress the decrease of throughput resulting from data retransmission and detect code errors.

One aspect of the radio system according to the present invention employs a configuration including: a receiving apparatus that builds in a code error detecting apparatus; and a transmitting apparatus that carries out on-off keying modulation of a pulse signal sequence transmitted to the receiving apparatus and transmits the pulse signal sequence.

According to this configuration, code errors of an on-off keying modulation signal can be detected by a comparatively simple method, so that it is possible to transmit data to the communicating party adequately by carrying out a retransmission depending on whether or not there is a detection result of code errors.

One embodiment of the receiving apparatus according to the present invention employs a configuration including: a receiving section that receives a first pulse signal sequence subjected to on-off keying modulation and a second pulse signal sequence, which is a code inverted sequence of the first pulse signal sequence; an arithmetic operation section that calculates log likelihood ratios of the first and second pulse signal sequences and acquires the first and second log likelihood ratios; and a decoding section that, when the second pulse signal sequence is received, decodes the first and second pulse signal sequences based on the first and second log likelihood ratios.

According to this configuration, when the first pulse signal sequence is influenced by delay waves of past on-pulse signals, the log likelihood ratio of the first pulse signal sequence can be corrected using the log likelihood ratio of a second pulse signal sequence, which is a code inverted sequence of the first pulse signal sequence, so that it is possible to reduce the influence of delay waves and improve received quality.

One aspect of the receiving apparatus according to the present invention employs a configuration in which the decoding section carries out decoding using a subtraction result of subtracting the second log likelihood ratio from the first log likelihood ratio for a log likelihood ratio.

According to this configuration, an on-pulse signal is transmitted as inverted data upon a retransmission even in a state where, even though an off-pulse signal is transmitted upon the first transmission, the log likelihood ratio shows that data is close to an on-pulse signal due to the influence of delay waves, and the log likelihood ratio shows the state where data is close to an on-pulse signal, so that the log likelihood ratio after subtraction is less likely to show that data is close to an on-pulse signal and, consequently, it is possible to avoid a situation where the on-pulse signal is decided due to the influence of delay waves.

One aspect of the receiving apparatus according to the present invention further includes a retransmission request deciding section that carries out an automatic repeat request based on a decoding result of the decoding section, and employs a configuration in which the receiving section receives a second pulse signal sequence as a retransmission signal of the first pulse signal sequence.

According to this configuration, upon a retransmission, a code inverted sequence of the first pulse signal sequence transmitted upon the first transmission is retransmitted, so that the log likelihood ratio is less likely to show that data is close to an on-pulse signal due to the influence of delay waves, and, consequently, it is possible to improve received quality.

One aspect of the receiving apparatus according to the present invention further includes a retransmission request deciding section that carries out a hybrid automatic repeat request based on a decoding result of the decoding section, and employs a configuration in which: the receiving section receives the original sequence as the first pulse signal sequence upon the first reception, receives a code inverted sequence of the original sequence as the second pulse signal sequence upon a reception of retransmission data and further receives the parity sequence with respect to the original sequence as the first pulse signal sequence; and the arithmetic operation section calculates the first log likelihood ratio based on the log likelihood ratios of the original sequence and the parity sequence with respect to the original sequence.

According to this configuration, when the parity sequence with respect to the original sequence is transmitted as the first pulse signal sequence by hybrid ARQ, the log likelihood ratio of the original sequence transmitted as the first pulse signal sequence can be corrected and calculated as the first log likelihood ratio using the parity sequence, so that it is possible to improve the reliability of the first log likelihood ratio.

One aspect of the receiving apparatus according to the present invention employs a configuration in which: the receiving section further receives, upon a reception of retransmission data, a code inverted sequence of the parity sequence with respect to the original sequence as the second pulse signal sequence; and the arithmetic operation section calculates the first log likelihood ratio based on log likelihood ratios of the original sequence, the parity sequence with respect to the original sequence and the code inverted sequence of the parity sequence.

According to this configuration, when the code inverted sequence of the parity sequence is transmitted as a second pulse signal sequence by hybrid ARQ, the log likelihood ratio of the original sequence transmitted as the first pulse signal sequence can be corrected and can be calculated as the first log likelihood ratio using the parity sequence transmitted as the first pulse signal sequence and the parity sequence transmitted as a second pulse signal, so that it is possible to further improve the reliability of the first log likelihood ratio.

One aspect of the receiving apparatus according to the present invention employs a configuration including: a receiving section that receives an on-off keying modulation signal sequence which is encoded by a Manchester code such that the polarity inverts between the first half and second half of a code; an arithmetic operation section that calculates the first log likelihood ratio showing that data is close to an on-pulse signal and a second log likelihood ratio showing that data is close to an off-pulse signal by switching the reference level between the first half and second half of the code and calculating the distance between the received on-off keying modulation signal sequence and the reference level; and a decoding section that decodes the code based on the first and second log likelihood ratios.

According to this configuration, even when delay waves arrive in a first half or second half that is fundamentally an off-pulse signal due to the influence of multipath, it is possible to reduce the influence of delay waves and carry out decoding.

One aspect of the transmitting apparatus according to the present invention employs a configuration including a transmitting section that the first pulse signal sequence that is subjected to on-off keying modulation and a second pulse signal sequence that inverts a code of the first pulse signal sequence upon an automatic repeat request.

According to this configuration, even when the first pulse signal sequence is influenced by delay waves of past on-pulse signals, the receiving end is able to correct the log likelihood ratio of the first pulse signal sequence using the log likelihood ratio of a second pulse signal sequence, which is a code inverted sequence of the first pulse signal sequence, so that it is possible to reduce the influence of delay waves and improve received quality.

One aspect of the transmitting apparatus according to the present invention employs a configuration in which the transmitting section transmits systematic bits as the first pulse signal sequence, and, upon an automatic repeat request, transmits a second pulse signal sequence with respect to the systematic bits and the first or second pulse signal sequence with respect to the parity bits.

According to this configuration, the receiving end is able to correct the log likelihood ratio of the original sequence by combining the log likelihood ratios acquired from the original sequence, inverted data of the original sequence, parity sequence or inverted data of the parity sequence, so that it is possible to improve the reliability of the log likelihood ratio and improve received quality.

The disclosures of Japanese Patent Application No. 2006-170451, filed on Jun. 20, 2006, and Japanese Patent Application No. 2007-161850, filed on Jun. 19, 2007, including the specifications, drawings and abstracts, are incorporated herein by reference in their entirety.

INDUSTRIAL APPLICABILITY

The present invention is useful for pulse transmission such as wireless communication to detect a time slot section in which a code error occurs in a propagation environment in which delay waves arrive due to, for example, multipath and intersymbol interference between time slots occurs. Particularly, the present invention is suitable for a code error detecting apparatus, radio system and error detecting method for realizing lower power consumption and lower cost in a high speed radio data transmission such as UWB.

The invention claimed is:
1. A code error detecting apparatus comprising:
a receiving terminal that receives a first pulse signal sequence subjected to on-off keying modulation and a second pulse signal sequence inverting a code of the first pulse signal sequence;

a pulse detecting section that outputs first and second detected data based on the first pulse signal sequence and the second pulse signal sequence received at the receiving terminal;

a code comparing section that compares codes of the first and second detected data output from the pulse detecting section;

an error detecting section that detects errors of the codes based on comparison results in the code comparing section;

a delay profile acquiring section that acquires a delay profile of a delay estimating symbol received at the receiving terminal;

a correlation section that carries out a correlation operation of the delay profile and a code of past decoded data to acquire a first correlation value and carries out a correlation operation of the delay profile and an inverted code of the past decoded data to acquire a second correlation value; and a deciding section that, when a code error is detected in the error detecting section, determines a code of decoded data in which the code error is detected, according to a comparison result of the first and second correlation values.

2. The code error detecting apparatus according to claim 1, wherein:

the code comparing section compares the codes of the detected data based on an exclusive disjunction; and the error detecting section decides that the codes are errors when the exclusive disjunction in the code comparing section is zero.

3. The code error detecting apparatus according to claim 1, wherein the pulse detecting section comprises:

an envelope detector that outputs envelopes of the pulse signal sequences received at the receiving terminal;

an integrator that integrates the envelopes of the pulse signal sequences; and a comparator that compares output values of the integrator and a predetermined threshold and outputs the detected data according to comparison decision results.

4. The code error detecting apparatus according to claim 3, wherein:

the comparator carries out the comparison per threshold, every threshold having a unique value, and outputs the detected data per threshold;

the code comparing section compares the codes of the detected data per threshold; and the error detecting section detects errors of the codes per threshold from comparison results per threshold.

5. The code error detecting apparatus according to claim 4, further comprising a threshold controlling section that carries out control to vary the thresholds until detection results in the error detecting section satisfy a predetermined condition.

6. The code error detecting apparatus according to claim 1, wherein, when the code error is detected, the deciding section uses the code of the first detected data as the code of the decoded data when the first correlation value is smaller than the second correlation value and uses the inverted code of the second detected data as the code of the decoded data when the first correlation value is greater than the second correlation value.

7. A radio system comprising:

a receiving apparatus that builds in a code error detecting apparatus; and a transmitting apparatus that carries out on-off keying modulation of a pulse signal sequence transmitted to the receiving apparatus and transmits the pulse signal sequence, wherein the code error detecting apparatus comprises:

a receiving terminal that receives a first pulse signal sequence subjected to on-off keying modulation and a second pulse signal sequence inverting a code of the first pulse signal sequence;

a pulse detecting section that outputs first and second detected data based on the first pulse signal sequence and the second pulse signal sequence received at the receiving terminal;

a code comparing section that compares codes of the first and second detected data output from the pulse detecting section;

an error detecting section that detects errors of the codes based on comparison results in the code comparing section;

a delay profile acquiring section that acquires a delay profile of a delay estimating symbol received at the receiving terminal;

a correlation section that carries out a correlation operation of the delay profile and a code of past decoded data to acquire a first correlation value and carries out a correlation operation of the delay profile and an inverted code of the past decoded data to acquire a second correlation value; and a deciding section that, when a code error is detected in the error detecting section, determines a code of decoded data in which the code error is detected, according to a comparison result of the first and second correlation values.

8. A code error detecting method comprising:

receiving, by a receiving terminal, a first pulse signal sequence subjected to on-off keying modulation and a second pulse signal sequence inverting a code of the first pulse signal sequence;

outputting first and second detected data based on the received first pulse signal sequence and second pulse signal sequence;

comparing codes of the first and second detected data;

detecting errors of the codes based on comparison results;

acquiring a delay profile of a delay estimating symbol received at the receiving terminal;

carrying out a correlation operation of the delay profile and a code of past decoded data to acquire a first correlation value and carrying out a correlation operation of the delay profile and an inverted code of the past decoded data to acquire a second correlation value; and determining, when a code error is detected, a code of decoded data in which the code error is detected, according to a comparison result of the first and second correlation values.

9. The code error detecting method according to claim 8, further comprising:

carrying out the on-off keying modulation of the first pulse signal sequence and transmitting the first pulse signal sequence; and inverting the code of the first pulse signal sequence and transmitting the second pulse signal sequence.

* * * * *